United States Patent
Gore et al.

(10) Patent No.: US 10,462,063 B2
(45) Date of Patent: *Oct. 29, 2019

(54) METHOD AND APPARATUS FOR DETECTING PACKET

(71) Applicant: Samsung Electronics Co., Ltd., Suwon-si (KR)

(72) Inventors: Ashutosh Deepak Gore, Bangalore (IN); Sujit Jos, Bangalore (IN); Jinesh P. Nair, Bangalore (IN); Chang Soon Park, Chungju-si (KR); Kiran Bynam, Jalahalli (IN); Young Jun Hong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 179 days.

This patent is subject to a terminal disclaimer.

(21) Appl. No.: 15/412,999

(22) Filed: Jan. 23, 2017

(65) Prior Publication Data

US 2017/0214628 A1     Jul. 27, 2017

(30) Foreign Application Priority Data

Jan. 22, 2016   (IN) .............................. 201641002504
Dec. 7, 2016    (KR) ........................ 10-2016-0165679

(51) Int. Cl.
    *H04L 27/26*     (2006.01)
    *H04L 12/801*    (2013.01)
    *H04L 12/741*    (2013.01)

(52) U.S. Cl.
    CPC .............. *H04L 47/34* (2013.01); *H04L 45/74* (2013.01)

(58) Field of Classification Search
    CPC ....... H04L 1/20; H04L 1/205; H04L 27/2675; H04L 47/34
    USPC .......................................... 375/316, 344–345
    See application file for complete search history.

(56) References Cited

U.S. PATENT DOCUMENTS

| | | | |
|---|---|---|---|
| 5,915,234 A * | 6/1999 | Itoh ........................ | G10L 19/12 704/219 |
| 6,202,046 B1 * | 3/2001 | Oshikiri .................. | G10L 25/78 704/226 |
| 7,068,987 B2 | 6/2006 | Baldwin et al. | |
| 7,327,717 B2 | 2/2008 | Borowski et al. | |
| 7,616,575 B2 | 11/2009 | Padhye et al. | |
| 7,668,523 B2 | 2/2010 | Adams et al. | |
| 8,014,416 B2 | 9/2011 | Ho et al. | |
| 8,145,165 B1 * | 3/2012 | Su ........................ | H03G 3/3052 455/232.1 |
| 8,238,494 B2 | 8/2012 | Sher et al. | |
| 8,792,877 B2 | 7/2014 | Wallace et al. | |

(Continued)

FOREIGN PATENT DOCUMENTS

| | | |
|---|---|---|
| KR | 10-0582280 B1 | 5/2006 |
| KR | 10-1338584 B1 | 12/2013 |
| KR | 10-1413876 B1 | 6/2014 |

*Primary Examiner* — Emmanuel Bayard
(74) *Attorney, Agent, or Firm* — NSIP Law

(57) ABSTRACT

A method to detect a packet includes: receiving an input sequence including preambles; detecting a transition from a noise period to a signal period in the input sequence; dynamically adjusting a gain of the input sequence in response to the signal period being initiated; and distinguishing an intended packet from other packets, among packets received in the preambles.

25 Claims, 27 Drawing Sheets

(56) References Cited

U.S. PATENT DOCUMENTS

| | | | |
|---|---|---|---|
| 2004/0190560 A1* | 9/2004 | Maltsev | H04L 27/2663 370/503 |
| 2006/0025090 A1* | 2/2006 | Shirakata | H04B 7/0808 455/136 |
| 2007/0025474 A1 | 2/2007 | Moorti et al. | |
| 2007/0230403 A1* | 10/2007 | Douglas | H04W 24/00 370/334 |
| 2009/0207953 A1* | 8/2009 | Matsunobu | H03G 3/001 375/345 |
| 2010/0093279 A1 | 4/2010 | Linsky et al. | |
| 2010/0135439 A1* | 6/2010 | Lackey | H04B 1/525 375/344 |
| 2011/0149773 A1* | 6/2011 | Lee | H03G 3/3078 370/252 |
| 2014/0293808 A1* | 10/2014 | Tsai | H04W 24/02 370/252 |
| 2015/0078172 A1* | 3/2015 | Chowdiah | H04L 43/12 370/241 |
| 2015/0103965 A1* | 4/2015 | Chari | H04L 27/2657 375/371 |
| 2015/0222373 A1* | 8/2015 | Tanaka | H04B 17/21 455/226.2 |
| 2016/0055852 A1* | 2/2016 | Daniel | G10L 21/0208 704/219 |
| 2016/0373158 A1* | 12/2016 | Ardalan | H04B 7/043 |
| 2016/0380788 A1* | 12/2016 | Waheed | H04B 1/30 375/319 |
| 2017/0230145 A1* | 8/2017 | Gore | H04W 52/0245 |

* cited by examiner

METHOD AND APPARATUS FOR DETECTING PACKET

CROSS-REFERENCE TO RELATED APPLICATIONS

This application claims the benefit under 35 USC § 119(a) of Indian Patent Application No. 201641002504, filed on Jan. 22, 2016, in the Indian Patent Office, and Korean Patent Application No. 10-2016-0165679, filed on Dec. 7, 2016, in the Korean Intellectual Property Office, the entire disclosures of which are incorporated herein by reference for all purposes.

BACKGROUND

1. Field

The following description relates to a method and apparatus for detecting an intended packet by a sliding intermediate frequency (SIF) non-coherent (NC) ultra low power (ULP) wireless receiver.

2. Description of Related Art

The ultra-low-power (ULP) wireless communication is gaining importance with the advent of Internet of Things (IoT), wearables and e-Health applications. In general, a ULP transceiver has low data rates, for example, 1 Mbps, and operates over short distances, for example, distances less than 50 meters (m). Existing ULP transceivers achieve power consumption of 1 nanojoule per bit (nJ/bit), which has led to the evolution of standards like IEEE 802.15.4q and Bluetooth Low Energy (BLE).

A radio frequency integrated circuit (RFIC) is a dominant power consuming block in ULP wireless communication. In order to extract maximum power savings from the RFIC, On-Off keying (OOK) has been developed as baseband (BB) modulation technique in the IEEE 802.15.4q standard. OOK BB modulation not only provides inherent modulation duty cycling at a transmitter power amplifier, but also leads to relaxed requirements on RFIC components such as a frequency synthesizer and a phase locked loop (PLL). Further, OOK enables a non-coherent (NC) receiver design, and thus obviates the need for phase synchronization.

Direct current offset (DCO) is a problem in sliding intermediate frequency (SIF) ULP receivers when gains of BB stages are high. Even small magnitudes of DCO may be significantly amplified due to the high gains. It is therefore important to estimate DCO and design a robust DCO compensation (DCOC) algorithm.

Automatic gain control (AGC) is a crucial feature of the ULP receivers to accommodate a wide dynamic range of received power levels. In absence of AGC, a total gain is fixed, which leads to either saturation effects or a low signal-to-noise ratio (SNR) at outputs of an analog-to-digital converter (ADC). In either case, a signal is not demodulated properly. Moreover, the performance of AGC may be affected by DCO.

IEEE 802.15.4q compliant ULP chipsets are expected to be deployed in e-Health and sensor applications, where the signal traffic is sparse and has a low duty cycle. Hence, a duration of a noise interval preceding an 802.15.4q PHY packet may be quite long. Thus, it is important to design an energy detection (ED) algorithm to declare a transition from a noise period to a signal period with a high reliability. Further, the ULP chipsets operate in an unlicensed 2.4 gigahertz (GHz) industrial scientific medical (ISM) band, coexisting with wireless local area network (WLAN) devices, Bluetooth (BT) and Bluetooth Low Energy (BLE) devices. Accordingly, there is a need to design a packet detection (PD) method that may reliably distinguish between 802.15.4q physical layer packets and other physical layer packets in the ISM band.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method to detect a packet includes: receiving an input sequence including preambles; detecting a transition from a noise period to a signal period in the input sequence; dynamically adjusting a gain of the input sequence in response to the signal period being initiated; and distinguishing an intended packet from other packets, among packets received in the preambles.

The method may further include dynamically compensating for unknown offset voltage values of the input sequence in the signal period before the distinguishing of the intended packet from the other packets.

The distinguishing of the intended packet from the other packets may include: computing a first peak autocorrelation value of an autocorrelation function in the noise period; computing a second peak autocorrelation value of the autocorrelation function in the signal period; determining whether a ratio of the second peak autocorrelation value to the first peak autocorrelation value exceeds a predetermined a ratio; and obtaining peak times of the autocorrelation function in successive sub-intervals present in at least two consecutive preambles of the signal period.

The distinguishing of the intended packet from the other packets may further include: determining whether at least one pair of the peak times is separated by a duration of a preamble having a jitter tolerance; identifying outliers in the peak times; and obtaining sanitized peak times by rejecting at most two of the outliers in the peak times.

The distinguishing of the intended packet from the other packets may further include: determining whether each pair of successive sanitized peak times is separated by a predetermined fraction of a duration of a preamble having an error tolerance; and distinguishing the intended packet from the other packets in response to determining that each pair of the successive sanitized peak times is separated by the predetermined fraction of the duration of the preamble having the error tolerance.

The detecting of the transition from the noise period to the signal period may include: computing variances of the input sequence over time windows of an equal duration in the noise period and the signal period; computing a relative variance value by computing a difference between each variance of each of the time windows and a reference value; and determining whether the relative variance value exceeds a predetermined threshold for a predetermined number of consecutive time windows among the time windows.

The detecting of the transition from the noise period to the signal period may include: dynamically compensating for unknown offset voltage values of the input sequence in the noise period; and computing a first peak autocorrelation value of an autocorrelation function in the noise period.

The intended packet may be an IEEE 802.15.4q physical layer packet.

A non-transitory computer-readable storage medium may store instructions, that when executed by a processor, cause the processor to perform the method.

In another general aspect, an ultra-low-power (ULP) wireless receiver includes: a processor configured to receive an input sequence including preambles; an energy detector configured to detect a transition from a noise period to a signal period in the input sequence; an automatic gain controller configured to dynamically adjust a gain of the input sequence in response to the signal period being initiated; and a packet detector configured to distinguish an intended packet from other packets, among packets received in the preambles.

The ULP wireless receiver may further include a direct current offset compensator configured to dynamically compensate for unknown offset voltage values of the input sequence in the signal period before the intended packet is distinguished from the other packets.

The packet detector may be configured to distinguish the intended packet from the other packets by: computing a first peak autocorrelation value of an autocorrelation function in the noise period; computing a second peak autocorrelation value of the autocorrelation function in the signal period; determining whether a ratio of the second peak autocorrelation value to the first peak autocorrelation value exceeds a predetermined a ratio; and obtaining peak times of the autocorrelation function in successive sub-intervals present in at least two consecutive preambles of the signal period.

The packet detector may be further configured to distinguish the intended packet from the other packets by: determining whether at least one pair of the peak times is separated by a duration of a preamble having a jitter tolerance; identifying outliers in the peak times; and obtaining sanitized peak times by rejecting at most two of the outliers in the peak times.

The packet detector may be further configured to distinguish the intended packet from the other packets by: determining whether each pair of successive sanitized peak times is separated by a predetermined fraction of a duration of a preamble having an error tolerance; and distinguishing the intended packet from the other packets in response to determining that each pair of the successive sanitized peak times is separated by the predetermined fraction of the duration of the preamble having the error tolerance.

The energy detector may be configured to detect the transition from the noise period to the signal period by: computing variances of the input sequence over time windows of an equal duration in the noise period and the signal period; computing a relative variance value by computing a difference between each variance of each of the time windows and a reference value; and determining whether the relative variance value exceeds a predetermined threshold for a predetermined number of consecutive time windows among the time windows.

The energy detector may be configured to detect the transition from the noise period to the signal period by: dynamically compensating for unknown offset voltage values of the input sequence in the noise period; and computing a first peak autocorrelation value of an autocorrelation function in the noise period.

The intended packet may be an IEEE 802.15.4q physical layer packet.

The packet detector may be configured to distinguish the intended packet from the other packets based on peak autocorrelation values of autocorrelation functions in the noise period and the signal period.

Other features and aspects will be apparent from the following detailed description, the drawings, and the claims.

Figure 1:
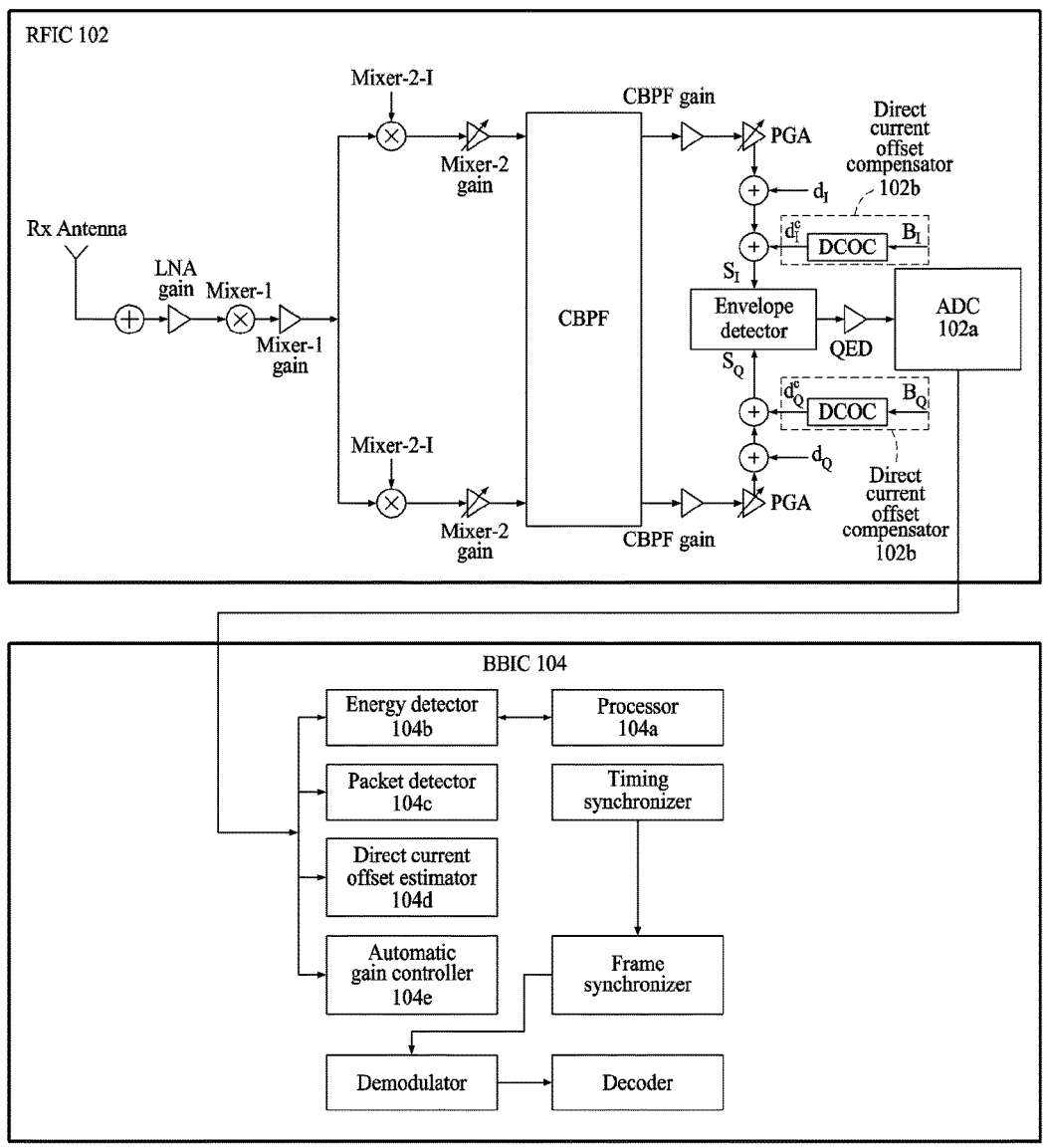
FIG. 1 is a block diagram illustrating an example of a sliding intermediate frequency (SIF) non-coherent (NC) ultra-low-power (ULP) wireless receiver, according to an embodiment.

Throughout the drawings and the detailed description, unless otherwise described or provided, the same drawing reference numerals refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

Hereinafter, reference will now be made in detail to examples with reference to the accompanying drawings, wherein like reference numerals refer to like elements throughout.

The embodiments disclosed herein provide a method and system for reliable detection of an intended packet by a sliding intermediate frequency (SIF) non-coherent (NC) ultra-low-power (ULP) wireless receiver.

The embodiments may be implemented in ULP receivers for reducing battery power consumption by turning on a baseband demodulation and decoding circuitry in a baseband integrated circuit (BBIC) during a presence of an 802.15.4q PHY signal. Further, in the embodiments, energy detection (ED) is performed reliably to ascertain a transition from a noise period to a signal period. Furthermore, in the disclosed method, a packet detector in the BBIC is triggered based on detected energy in order to distinguish between the intended packet (for example, an IEEE 802.15.4q physical layer packet) and other physical layer packets in an unlicensed 2.4 gigahertz (GHz) industrial scientific medical (ISM) band.

The embodiments utilize an automatic gain control (AGC) technique by which gains in a radio frequency integrated circuit (RFIC) are set to values which are appropriate for successfully demodulating a signal in the BBIC. Further, the embodiments employ a direct current offset compensation (DCOC) technique which compensates for various and random direct current offsets (DCOs) across in-phase and quadrature rails at a back-end of the RFIC. The efficient DCOC ensures that there are no errors in the baseband demodulation.

The embodiments provide a mechanism for integration of ED, packet detection (PD), AGC and DCOC techniques as an "outer receiver system" in the SIF NC receiver that processes IEEE 802.15.4q physical layer packets.

Additionally, the disclosed embodiments provide a mechanism of NC PD for a preamble portion of an IEEE 802.15.4q physical layer packet. The proposed PD method exploits repetition properties of an 8-chip sub-preamble based on autocorrelation and leverages the fact that a ratio of a peak value to an average value is very high. Additionally, the PD method involves various determinations or checks (such as a coarse check, an outlier check, and a fine check) before declaring the intended packet as the 802.15.4q physical layer packet. The embodiments may be used to reduce a number of false detections during the noise period and at a noise-to-signal boundary. Further, the example embodiments may be used to distinguish between the intended packet (for example, the IEEE 802.15.4q physical layer packet) and other packets (for example, WLAN/BT/BLE physical layer packets).

Throughout the disclosure, the terms "signal period" and "post noise period" have the same meaning.

FIG. 1 is a block diagram illustrating an example of an SIF NC ULP wireless receiver 100, according to an embodiment.

Referring to FIG. 1, the SIF NC ULP wireless receiver 100 includes an RFIC 102 and a BBIC 104.

As depicted in FIG. 1, an incoming air signal with an amplitude A impinges a receiver (Rx) antenna. The air signal with the amplitude A is represented as $r(t)=A \cos(2\pi f_{RF}t)+w(t)$. Here, $f_{RF}$ is a signal center frequency, and $w(t)$ is white Gaussian noise (WGN) with a power spectral density (PSD) of −174 decibel-milliwatts per hertz (dBm/Hz). An output signal of the antenna is amplified by a low noise amplifier (LNA).

After being amplified by the LNA, the signal impinges a mixer-1, where the signal is multiplied by a tone cos $(2\pi f_{MX1}t)$. Here, $f_{MX1}$ is a beating frequency of the mixer-1. This operation results in signal energy having a frequency translated to $(f_{RF}+f_{MX1})$ and $f_{RF}-f_{MX1}=f_{IF1}$. Here, $f_{IF2}$ is a first intermediate frequency (IF). A higher frequency component is rejected by a complex band pass filter (CBPF). After the mixer-1, the signal is processed in a quadrature manner (for example, along I and Q rails) up to a quadrature envelope detector (QED).

A mixer-2 down-converts an output signal of the mixer-1 to a second IF $f_{IF2}$ for "near baseband" filtering. Particularly, the output signal of the mixer-1 is multiplied by cos($2\pi f_{MX2}t$) on an I-arm, and multiplied by sin($2\pi f_{MX2}t$) on a Q-arm. Here, $f_{MX2}$ denotes a beating frequency of the mixer-2. The near baseband filtering yields cross-modulation products at frequencies $f_{IF1}+f_{MX2}$ and $f_{IF1}-f_{MX2}=f_{IF2}$. The higher frequency component is rejected by the CBPF in a receiver signal path. I and Q outputs of the mixer-2 are amplified by the same value of a gain of the mixer-2.

The amplified I and Q outputs of the mixer-2 are fed to I and Q inputs of the CBPF. Here, out-of-band signal components are rejected at $f_{RF}+f_{MX1}$ and $f_{IF1}+f_{MX2}$. A "center frequency" of the CBPF $f_{IF2}$ is tuned to 1.3 megahertz (MHz). The CBPF has a fixed gain on each of its arms. Post filtering, for example, the I and Q inputs are scaled by a programmable gain amplifier (PGA). In this example, it is assumed that the same value of a gain of the PGA is applied to both arms.

Outputs of PGAs are corrupted by unknown values of DCOs. Specifically, a random DCO voltage $d_I$ is added to an analog output of a PGA on the I-arm to form a first corrupted signal. Also, a random DCO voltage $d_Q$ is added to an analog output of the PGA on the Q-arm to form a second corrupted signal. Corresponding compensation voltages $d_I^c$ and $d_Q^c$ are respectively added to the first and second corrupted signals to form first and second compensated signals $S_I$ and $S_Q$ prior to the first and second compensation signals $S_I$ and $S_Q$ being fed to the QED. The QED computes a root mean square (RMS) value $\sqrt{S_I^2+S_Q^2}$.

An output of the QED is fed to an 8-bit NC analog-to-digital converter (ADC) 102a with a sampling rate $F_{samp}$=3 Msps. An output of the ADC 102a is processed by digital logic blocks in the BBIC 104.

TABLE 1

| Description | Symbol | Set of value(s) in dB |
| --- | --- | --- |
| LNA gain | $g_{LNA}$ | {-3, 9, 21} |
| Mixer-1 gain | $g_{MX1}$ | 21.5 |
| Mixer-2 gain | $g_{MX2}$ | {0, 12} |
| CBPF gain | $g_{CBPF}$ | 8 |
| PGA gain | $g_{PGA}$ | 0:0.75:37.5 |
| QED gain | $g_{QED}$ | 3 |

Table 1 shows permissible gain values of all components in the RFIC 102. The gain of the PGA may have any value from 0 decibels (dB) to 37.5 dB in steps of 0.75 dB. Gains of the LNA, the mixer-2, and the PGA are variable. That is, gains of the LNA, the mixer-2, and the PGA are controllable by an automatic gain controller 104e. Further, the gains of the mixer-1, the CBPF, and the QED are constant, with a total value $g_{constant}=g_{MX1}+g_{CBPF}+g_{QED}=32.5$ dB.

The ADC 102a samples as well as quantizes an incoming analog signal. The RFIC 102 of FIG. 1 employs an 8-bit successive approximation register ADC. The ADC 102a may have the following features:

a. Within the ADC 102a, the signal is restricted to the range [0, 800] millivolts (mV). Thus, any voltage exceeding 800 mV is clamped down to 800 mV;
b. An output of the ADC 102a is an 8-bit unsigned integer. Equivalently, a resolution of the ADC 102a is 8 bits; and
c. An input of the ADC 102a is uniformly quantized to 256 levels at the output. The automatic gain controller 104e, a direct current offset compensator 102b, a packet detector 104c, and an energy detector 104b interpret the output of the ADC 102a as a discrete voltage with an amplitude resolution of 3.125 mV.

In the BBIC 104, only "outer receiver" components which operate during the noise period and during the preamble portion of the IEEE 802.15.4q signal period are considered. These components are a processor 104a, the energy detector 104b, the packet detector 104c, a direct current offset estimator 104d, and the automatic gain controller 104e. All these components are digital logic blocks within the BBIC 104. The best possible interconnection and scheduling of these blocks is critical for successful BB demodulation and achieving ULP power targets.

A common input data signal to all the outer receiver components, for example, the energy detector 104b, the packet detector 104c, the direct current offset estimator 104d, and the automatic gain controller 104e, is an output sequence of samples y(n) of the ADC 102a. y(n) is, for example, a non-negative, real and quantized output of the ADC 102a at a sampling time index n. It should be noted that y(n)∈[0,800] mV. A resolution of y(n) is, for example, 3.125 mV.

The processor 104a receives an input sequence which includes the samples of the ADC 102a from the RFIC 102 of the SIF NC ULP receiver 100. For example, the input sequence includes preambles and data. The processor 104a controls the other components or facilitates communication among the other components present in the RFIC 102.

The energy detector 104b detects a transition from the noise period to the signal period in the input sequence. The energy detector 104b computes variances of the input sequence over time windows of an equal duration (for example, eight microseconds (μs)) in the noise period. Further, the energy detector 104b computes a relative variance value by computing a difference between each variance of each time window and a reference value. Furthermore, the energy detector 104b determines whether the relative variance value exceeds a predetermined threshold for a predetermined number of consecutive time windows. The computations performed by the energy detector 104b will be described in graphs shown in FIGS. 8A through 8C.

The automatic gain controller 104e dynamically adjusts a gain of the input sequence when the signal period is initiated. The automatic gain controller 104e determines and iteratively changes values of the gains of the LNA, the mixer-2, and the PGA to ensure that an output signal of the ADC 102a has a sufficient signal-to-noise ratio (SNR) for BB demodulation. For example, the noise refers to cumulative effects of thermal Gaussian noise, non-linear noise and quantization noise (due to a finite resolution of the ADC 102a).

The processor 104a triggers the packet detector 104c after adjusting the gain of the input sequence.

The packet detector 104c distinguishes an intended packet from other packets, among packets received in the preambles. For example, the intended packet is an IEEE 802.15.4q physical layer packet. The packet detector 104c performs one or more checks or validations during the signal period for detecting the intended packet from among the received packets. The various checks or validations performed by the packet detector 104c will be described with reference to FIG. 6.

The direct current offset estimator 104d provides two outputs, for example, $B_I$ for I-arm direct current offset estimation (DCOE) and $B_Q$ for Q-arm DCOE. A timing synchronizer is used to obtain bit-level timing acquisition from a preamble. A frame synchronizer performs start frame delimiter (SFD) detection and obtains frame-level timing acquisition. A demodulator is used to despread a PHY service data unit (PSDU) portion of a packet. A decoder is used to decode information bits that have been encoded with a forward error correction (FEC) code at a transmitter.

FIGS. 2A through 2D illustrate examples of input/output signals of the components of FIG. 1.

Figure 2A:
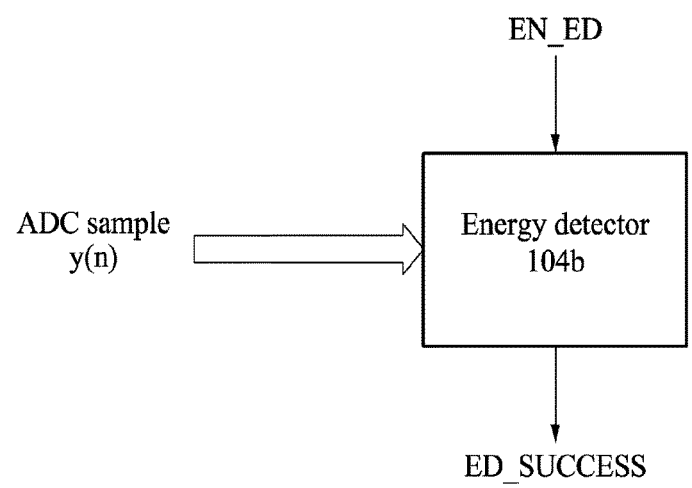
FIGS. 2A, 2B, 2C and 2D illustrate examples of input/output signals of components of FIG. 1.

Referring to FIG. 2A, the energy detector 104b is turned ON when an input control signal EN_ED is high (at a high level, for example, for logic "1"). When the input control signal EN_ED is low (at a low level, for example, for logic "0"), the energy detector 104b is deactivated (for example, in an idle or low power state). When the energy detector 104b detects signal energy, an output control signal ED_SUCCESS is high (at a high level), to indicate that the processor 104a triggers the automatic gain controller 104e. Otherwise, a default state of the output control signal ED_SUCCESS is low (at a low level).

Figure 2B:
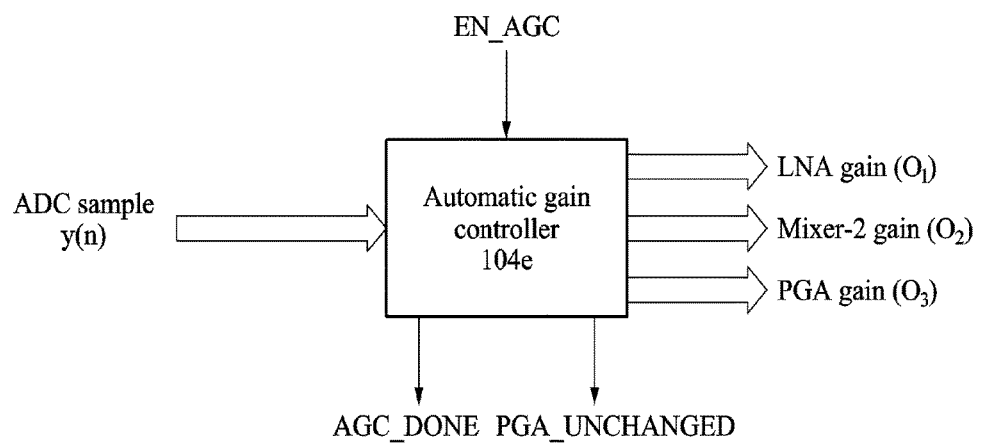

Referring to FIG. 2B, the automatic gain controller 104e is triggered when an input control signal EN_AGC from the processor 104a is high. As depicted in FIG. 2B, output data signals from the automatic gain controller 104e include:
  a. 2-bit line $O_1$, to select 1 out of 3 values of LNA gain $g_{LNA}$;
  b. 1-bit line $O_2$, to select 1 out of 2 values of mixer-2 gain $g_{MX2}$; and
  c. 6-bit line $O_3$, to select 1 out of 51 values of PGA gain $g_{PGA}$.

The output data signals $O_1$, $O_2$, and $O_3$ are interfaced with the RFIC 102. The output control signals from the AGC 104e are AGC_DONE and PGA_UNCHANGED. A default value of the output control signal AGC_DONE is low. The output control signal AGC_DONE is high after adjusting the gain of the input sequence. This is an indication that the processor 104a triggers the packet detector 104c or the direct current offset estimator 104d, depending on initial conditions (for example, BB register settings) of the SIF NC ULP receiver 100.

Figure 2C:
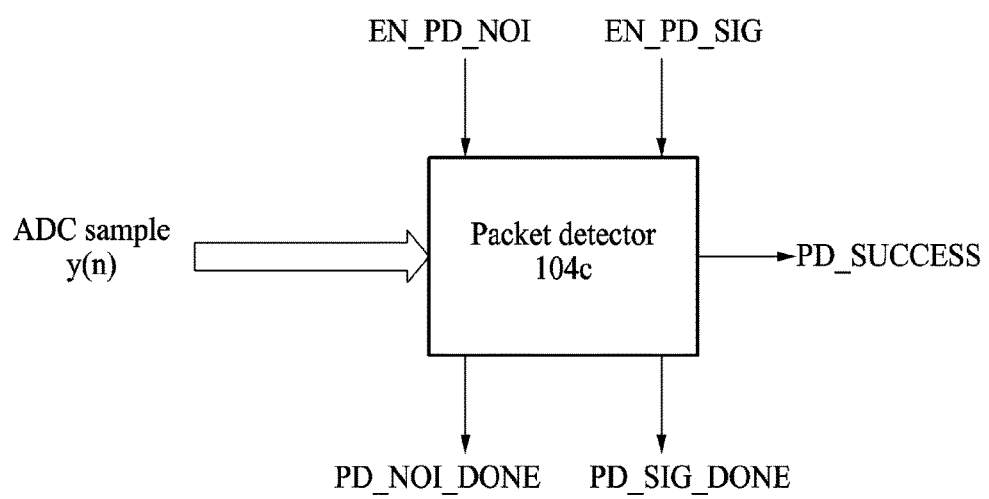

Referring to FIG. 2C, the packet detector 104c is triggered when either of an input control signal EN_PD_NOI or an input control signal EN_PD_SIG is high. These input control signals correspond to stages of detection of the intended packet in the "noise period" and the "post noise period", respectively. Output control signals of the packet detector 104c are PD_NOI_DONE, PD_SIG_DONE and PD_SUCCESS. Depending on the stage and result of detection of the intended packet, one or more of these signals (for example, PD_NOI_DONE, PD_SIG_DONE and PD_SUCCESS) are turned high.

After completion of the noise period, the output control signal PD_NOI_DONE is always high. After the post-noise period, the output control signal PD_SIG_DONE is always high. In the event that the packet detector 104c has detected an IEEE 802.15.4q PHY signal in the post noise period, the output control signal PD_SUCCESS goes high. Default values of the output control signals PD_NOI_DONE, PD_SIG_DONE and PD_SUCCESS are low (for example, logic "0").

Figure 2D:
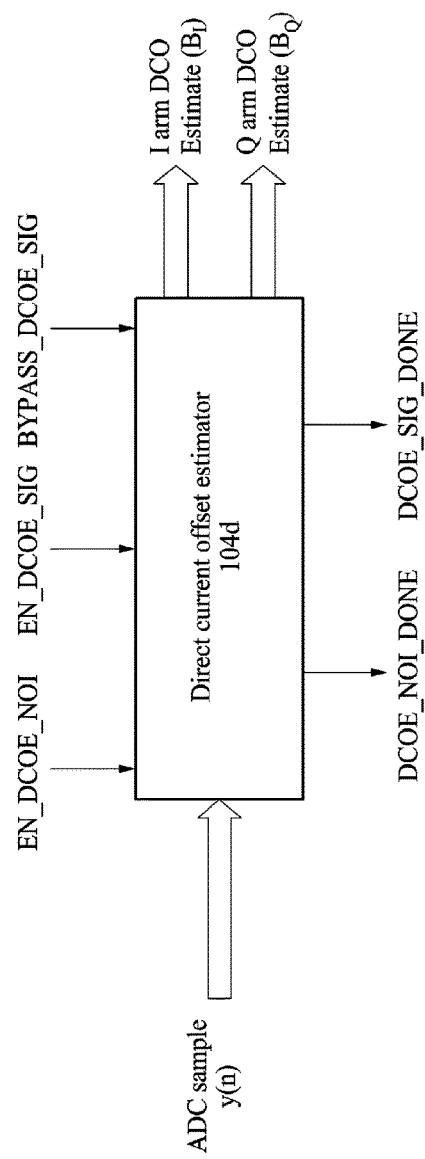

Referring to FIG. 2D, the direct current offset estimator 104d is triggered when any of input control signals EN_DCOE_NOI, EN_DCOE_SIG or BYPASS_DCOE_SIG is high. The first two control signals (for example, EN_DCOE_NOI and EN_DCOE_SIG) correspond to "noise period" and "signal period" stages of the direct current offset estimator 104d. The third control signal (for example, BYPASS_DCOE_SIG) indicates that the direct current offset estimator 104d is not required in the signal period. The output data signals from the direct current offset estimator 104d include:

a. 8-bit line $B_I$, to select 1 out of 256 values of I-arm DCOE $\hat{d}_I$; and
  b. 8-bit line $B_Q$, to select 1 out of 256 values of Q-arm DCOE $\hat{d}_Q$.

The output control signals of the direct current offset estimator 104d are DCOE_NOI_DONE and DCOE_SIG_DONE. Depending on the stage of the direct current offset estimator 104d, one of these signals is tuned high. After the direct current offset estimator 104d is completed in the noise period, the output control signal DCOE_NOI_DONE turns high. After the direct current offset estimator 104d is completed in the signal period, the output control signal DCOE_SIG_DONE turns high. Default values of the output control signals DCOE_NOI_DONE and DCOE_SIG_DONE are low.

Figure 3A:
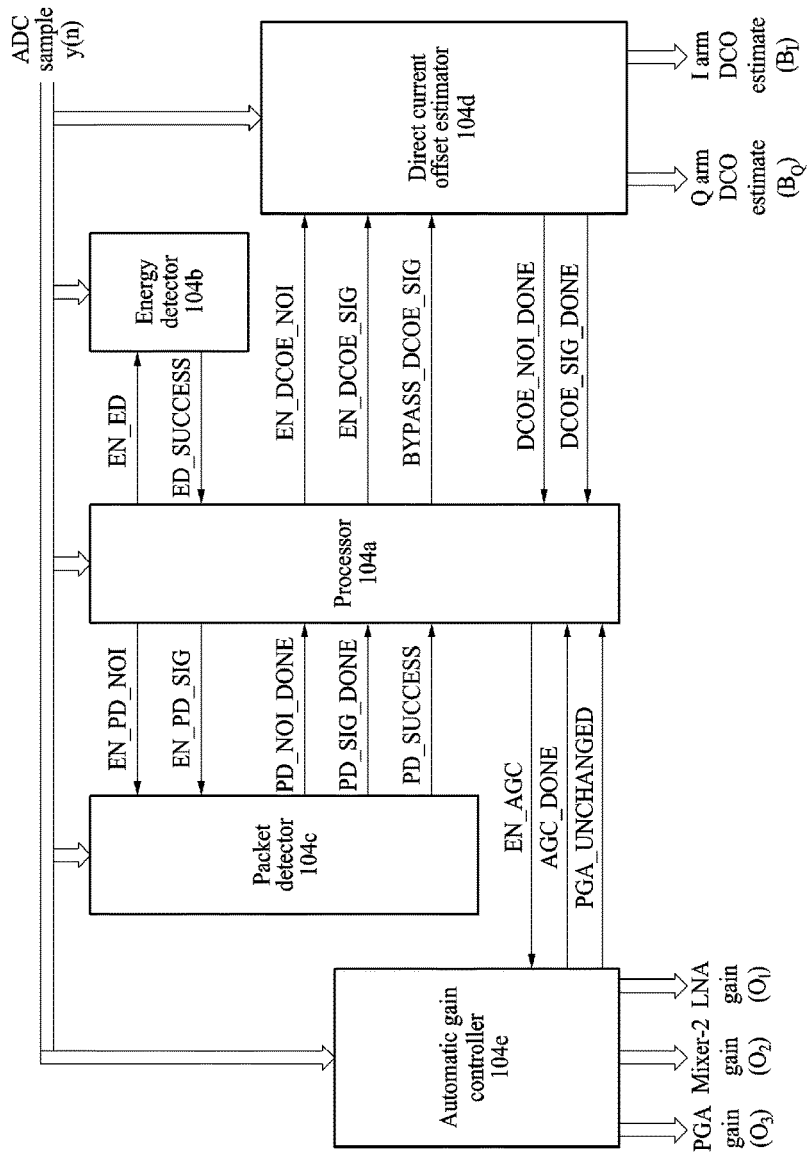
FIG. 3A illustrates an example of interconnection signaling between the various components of FIG. 1.

FIG. 3A illustrates an example of interconnection signaling between the various components of FIG. 1. More particularly, interconnection among the energy detector 104b, the direct current offset estimator 104d, the packet detector 104c, and the automatic gain controller 104e in the SIF NC ULP receiver 100 is shown in FIG. 3A. From FIG. 3A, it is observed that the processor 104a triggers the packet detector 104c (through the control signal EN_PD_NOI) or the direct current offset estimator 104d (through the control signal EN_DCOE_NOI) based on the values stored in BB registers.

Table 2 (below) shows time budgets of the outer receiver components in the SIF NC receiver 100 during the noise period and the signal period.

TABLE 2

| Outer receiver block | Stage | Time budget (microseconds) |
|---|---|---|
| Energy detector | Noise | Indefinite |
|  | Post noise/signal | 24 |
| Packet detector | Noise | 96 |
|  | Post noise/signal | 96 |
| Automatic gain controller | Post noise/signal | 32 |
| Direct current offset estimator | Noise | 12 |
|  | Signal | 24 |

Figure 3B:
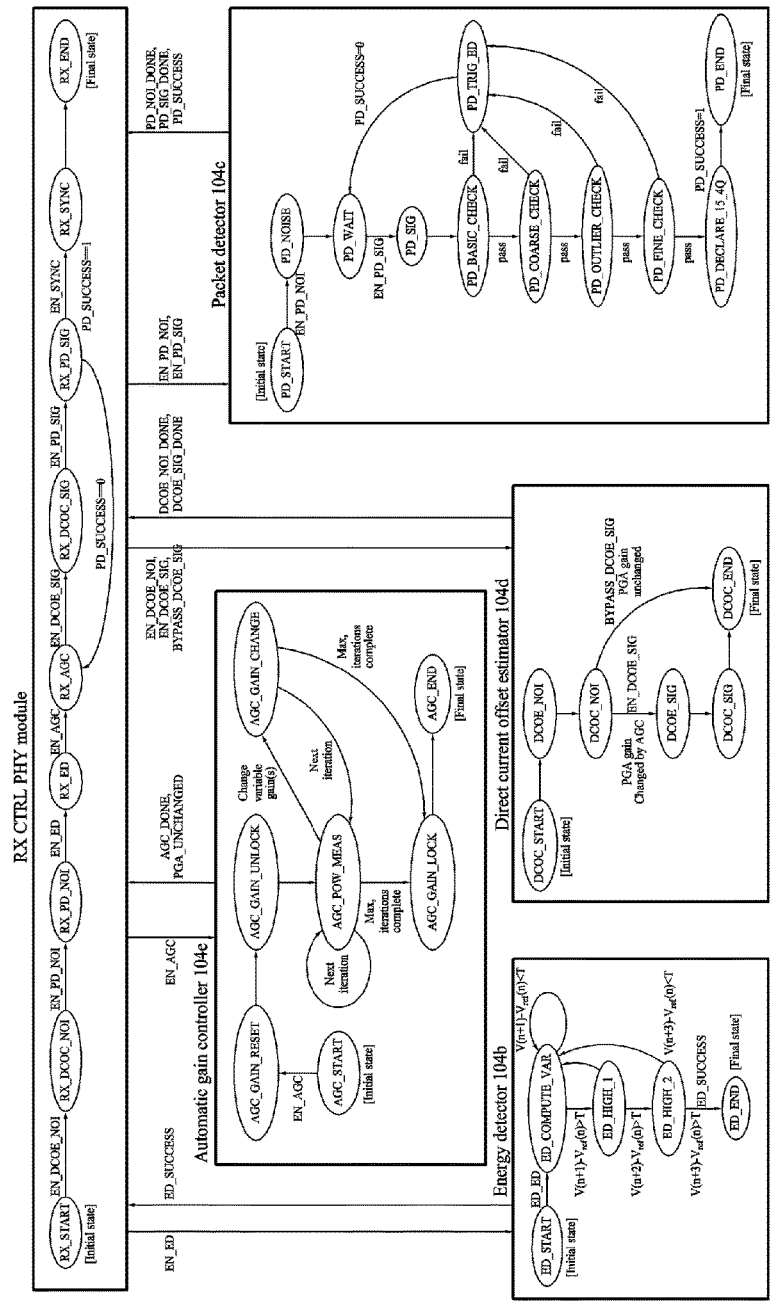
FIG. 3B illustrates an example of a finite state machine (FSM) representation of the components of FIG. 1.

FIG. 3B illustrates an example of a finite state machine (FSM) representation of the components of FIG. 1.

An FSM logic of the energy detector 104b is as shown in FIG. 3B. An initial state of the energy detector 104b is ED_START. When triggered by the processor 104a through a control signal EN_ED, the energy detector 104b transitions to a state ED_COMPUTE_VAR for computing variances of an input sequence across successive time windows. With reference to FIG. 3B, assume V(k) is a variance of the input sequence for a time window $k^{th}$. In the state ED_COMPUTE_VAR, the energy detector 104b computes a value V(k+1) and updates a value $V_{ref}(k)$ for time windows $(k+1)^{th}$ and $k^{th}$, respectively. If V(k+1)−$V_{ref}(k)$<T (T being an ED threshold), the energy detector 104b returns to the same state ED_COMPUTE_VAR. Otherwise, if V(k+1)−$V_{ref}(k)$≥T, the energy detector 104b transitions to a state ED_HIGH_1. In the state ED_HIGH_1, the energy detector 104b computes a value V(k+2). If V(k+2)−$V_{ref}(k)$≥T, the energy detector 104b transitions to a state ED_HIGH_2. Otherwise, the energy detector 104b transitions to the state ED_COMPUTE_VAR. In the state ED_HIGH_2, the energy detector 104b checks whether V(k+3)−$V_{ref}(k)$≥T. If V(k+3)−$V_{ref}(k)$≥T is false in the state ED_HIGH_2, the energy detector 104b returns to the state ED_COMPUTE_VAR. If V(k+3)−$V_{ref}(k)$≥T is true in the state ED_HIGH_2, the energy detector 104b transitions to a state ED_END. In this state ED_END, the energy detector 104b sets an output control signal ED_SUCCESS to be high. In this example, a sojourn time in each state by the energy detector 104b is 8 µs (for example, a duration of variance measurement window).

Additionally, an FSM of the packet detector 104c is as shown in FIG. 3B. An initial state of the packet detector 104c is PD START. When triggered by an input control signal EN_PD_NOI from the processor 104a, the packet detector 104c transitions to a state PD_NOISE. In the state PD_NOISE, the packet detector 104c computes a first peak autocorrelation value ρ during the noise period. Further, the packet detector 104c transitions to a state PD_WAIT. When triggered by an input control signal EN_PD_SIG from the processor 104a, the packet detector 104c transitions to a state PD_SIG. In the state PD_SIG, the packet detector 104c computes a second peak autocorrelation value σ during the post-noise period. Further, the packet detector 104c transitions to a state PD_BASIC_CHECK and determines whether σ/ρ>2. If the packet detector 104c determines that σ/ρ≤2, the packet detector 104c transitions to a state PD_TRIG_ED. In the state PD_TRIG_ED, the output control signal PD_SIG_DONE is high as shown in FIG. 3A, and the packet detector 104c returns to the state PD_WAIT. Moreover, the output control signal PD_SUCCESS is low. On the other hand, if a basic check passes (σ/ρ>2), the packet detector 104c transitions from the state PD_BASIC_CHECK to a state PD_COARSE_CHECK. In this state, the packet detector 104c executes a coarse check. If the packet detector 104c clears the coarse check, the packet detector 104c transitions to a state PD OUTLIER CHECK and checks for outliers in a sequence of eight peak times. If the outlier check is cleared, the packet detector 104c transitions to a state PD_FINE_CHECK and scrutinizes a sequence of sanitized peak times. If a fine check is cleared, the packet detector 104c transitions to a state PD_DECLARE_15_4Q. In the state PD_DECLARE_15_4Q, the packet detector 104c activates the output control signal PD_SUCCESS to be high. Further, the packet detector 104c transitions to a final state PD END. As a concluding remark, if any of the three previous checks (the coarse check, the outlier check or the fine check) is not cleared, the packet detector 104c returns to the state PD_TRIG_ED, sets the output control signal PD_SIG_DONE to be high, and transitions to the state PD_WAIT. Furthermore, the output control signal PD_SUCCESS is kept low.

An FSM of the automatic gain controller 104e is as shown in FIG. 3B. An initial state of the automatic gain controller 104e is AGC START. When triggered by the processor 104a through an input control signal EN_AGC, the automatic gain controller 104e transitions to a state AGC_GAIN_RESET. In the state AGC_GAIN_RESET, the automatic gain controller 104e sets all variable gains to their highest values. Further, the automatic gain controller 104e transitions to a state AGC_GAIN_UNLOCK, which indicates that variable gains may be changed during the course of AGC. Further, the automatic gain controller 104e transitions to a state AGC_POW_MEAS for an average power computation during an 8-µs window. If the automatic gain controller 104e determines that variable gains have to be changed, the automatic gain controller 104e transitions to a state AGC_GAIN_CHANGE. In the state AGC_GAIN_CHANGE, the automatic gain controller 104e transmits output data signals $O_1$, $O_2$, and $O_3$ to change the gains of the LNA, the mixer-2, and the PGA in the RFIC 102.

If another iteration of power measurement is required, the automatic gain controller 104e returns to the state AGC_POW_MEAS. On the other hand, if an AGC logic determines that all variable gains should remain unchanged and another power measurement iteration is due, the automatic gain controller 104e returns to the state AGC_POW_MEAS. If a maximum number of AGC iterations (for example, 4 AGC iterations) are completed, the automatic gain controller 104e transitions from the state AGC_POW_MEAS or AGC_GAIN_CHANGE to a state AGC_GAIN_LOCK. In this state AGC_GAIN_LOCK, the variable gains are locked and may not be changed thereafter. An output control signal AGC_DONE is set to be high (for example, logic "1"). Further, the automatic gain controller 104e transitions to a final state AGC END.

Also, an FSM of the direct current offset estimator 104d is as shown in FIG. 3B. An initial state of the direct current offset estimator 104d is DCOC_START. When triggered by an input control signal EN_DCOE_NOI from the processor 104a, the direct current offset estimator 104d transitions to a state DCOE_NOI. In this state DCOE_NOI, the direct current offset estimator 104d estimates I-arm and Q-arm DCOs during the noise period. Further, the direct current offset estimator 104d transitions to a state DCOC_NOI. In the state DCOC_NOI, the direct current offset estimator 104d transmits output data signals $B_I$ and $B_Q$ to apply DCO compensation values $d_I^c$ and $d_Q^c$ in the RFIC 102.

When triggered by the processor 104a through an input control signal EN_DCOE_SIG, the direct current offset estimator 104d transitions to a state DCOE_SIG. The control signal EN_DCOE_SIG is high only when the gain of the PGA is varied by the automatic gain controller 104e. In the state DCOE_SIG, the direct current offset estimator 104d estimates I-arm and Q-arm DCOs during the signal period. Further, the direct current offset estimator 104d transitions to a state DCOC SIG, to apply new DCO compensation voltages $d_I^c$ and $d_Q^c$ in the RFIC 102 (until the end of packet). Further, the direct current offset estimator 104d sets an output control signal DCOE_SIG_DONE to be high, and transitions to a final state DCOC END.

In the state DCOC_NOI, when the gain of the PGA is not varied by the automatic gain controller 104e, an input control signal BYPASS_DCOE_SIG turns high. In such a scenario, the direct current offset estimator 104d directly transitions from the state DCOC_NOI to the state DCOE_END.

Figure 4:
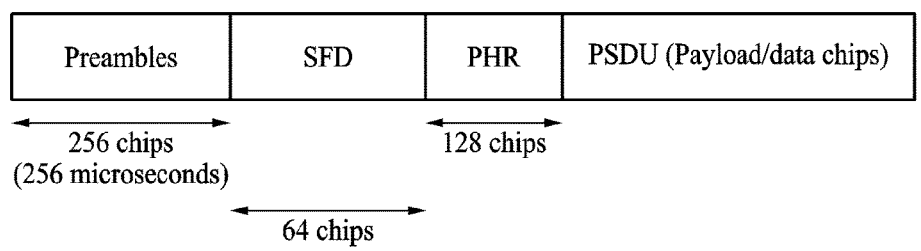
FIG. 4 illustrates an example of an IEEE 802.15.4q physical layer packet format.

FIG. 4 illustrates an example of an IEEE 802.15.4q physical layer packet format. An IEEE 802.15.4q is a ULP physical layer packet for the IEEE 802.15.4 wireless personal area network (WPAN) standard. As depicted in FIG. 4, a header portion includes preambles, an SFD, and a PHY header (PHR). A payload portion, referred to as a PHY service data unit (PSDU), includes actual data bits. The preambles of the packet format are used for PD, AGC, DCOC, and timing synchronization (sync). The SFD is used for frame synchronization. The PHR is used to convey a modulation and coding scheme used along with PSDU length information. The preambles and SFD are collectively referred to as a synchronization header (SHR).

Figure 5A:
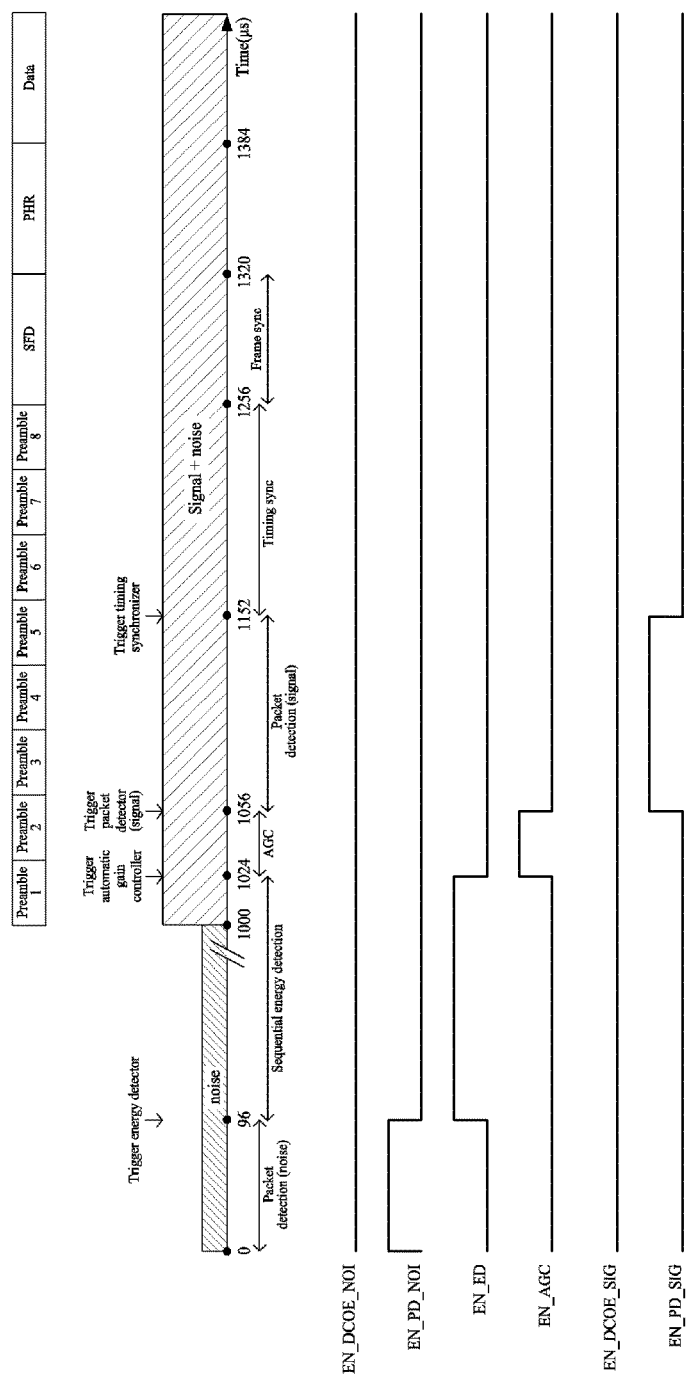
FIGS. 5A and 5B illustrate examples of timing diagrams and control signals associated with the components of FIG. 1.
Figure 5B:
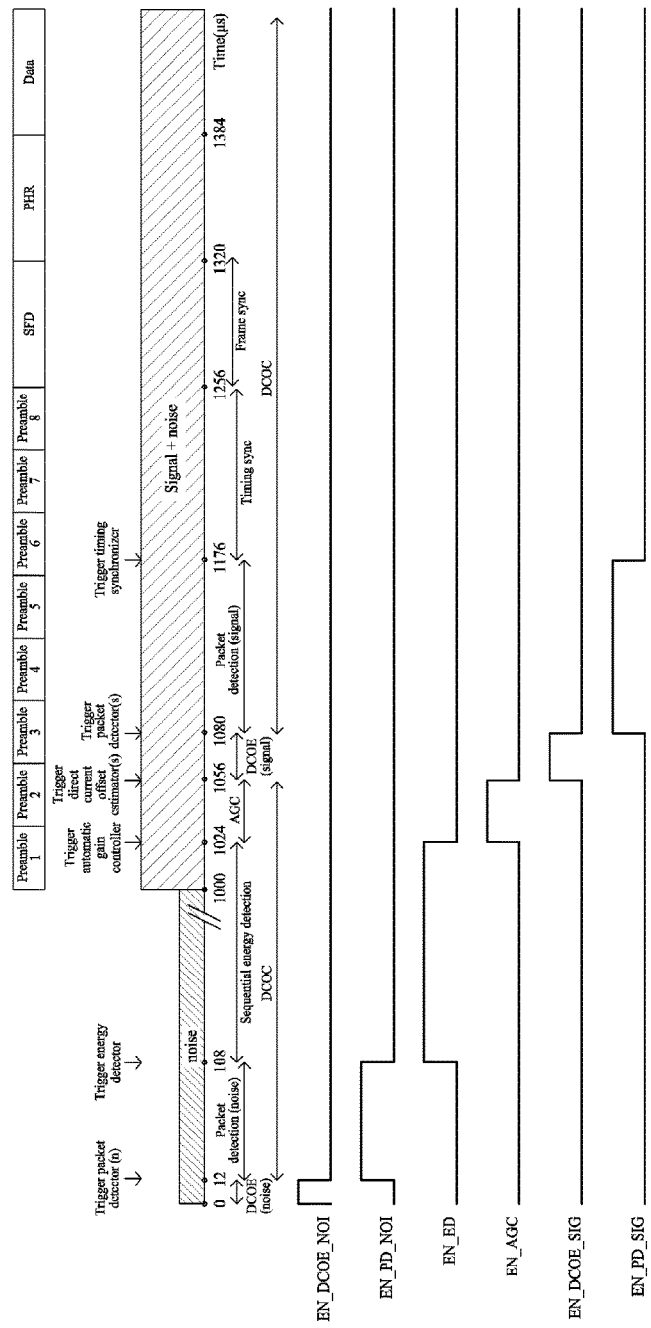

FIGS. 5A and 5B illustrate examples of timing diagrams and control signals associated with the components of FIG. 1. As depicted in FIG. 5B, a noise period is between a time point of 0 µs and a time point of 1000. After the time point of 1000 µs, a signal period is initiated. The signal period may be considered as a "post noise period." In the noise period, the direct current offset estimator 104d and the packet detector 104c are enabled for performing computations. The direct current offset estimator 104d is enabled between the time point of 0 µs and a time point of 12 µs, and the packet detector 104c is enabled from the time point of 12 µs to a time point of 108 µs (for example, for duration of 96 µs).

The direct current offset compensator 102b dynamically compensates for unknown offset voltage values $B_I$ and $B_Q$ of an input sequence in the noise period between the time points of 12 µs and 1000 µs.

The packet detector 104c computes a first peak autocorrelation value of an autocorrelation function in the noise period between the time point of 12 µs and a time point of 108 µs. The computed first peak autocorrelation value of the autocorrelation function in the noise period is stored in the packet detector 104c for future use (during the post noise period).

The energy detector 104b is enabled from the time point of 108 µs to a time point of 1024 µs. The energy detector 104b computes variances of the input sequence over time windows of an equal duration in the noise period and the signal period, as shown in FIG. 5B. The energy detector 104b computes a relative variance value by computing a difference between each variance of each time window and a reference value, in the noise period and the signal period. Further, the energy detector 104b determines whether the computed relative variance value exceeds a predetermined threshold for a predetermined number of consecutive time windows. As illustrated in FIG. 5B, it is noted that the energy detector 104b utilizes three consecutive time windows (each window having a duration of 8 µs) in the signal period.

The automatic gain controller 104e is enabled from the time point of 1024 µs to a time point of 1056 µs. The automatic gain controller 104e dynamically adjusts a gain of the input sequence when the signal period is initiated.

Further, the direct current offset estimator 104d is enabled from the time point of 1056 µs to a time point of 1080 µs (for example, for a duration of 24 µs). In the signal period, the direct current offset estimator 104d compensates for the unknown offset voltage values $B_I$ and $B_Q$.

Further, the packet detector 104c is enabled for packet detection from the time point of 1080 µs to a time point of 1176 µs during the signal period. During the signal period, the packet detector 104c distinguishes an intended packet (for example, an IEEE 802.15.4q physical layer packet) from other packets, among received packets. As shown in FIG. 5B, the packet detector 104c utilizes three preambles (for example, for a duration of 96 µs) for distinguishing the intended packet from the other packets.

Further, the timing synchronizer is enabled from the time point of 1176 µs to a time point of 1256 µs. Also, a frame synchronizer is enabled from the time point of 1256 µs to a time point of 1320 µs.

As depicted in FIG. 5A, the noise period is between a time point of 0 µs and a time point of 1000 µs. After thousand µs, the signal period is initiated. The direct current offset estimator 104d is disabled during the noise period as well as the signal period, as shown in FIG. 5A.

In the noise period, the packet detector 104c is enabled for performing computations. The packet detector 104c is enabled from the time point of 0 µs to a time point of 96 µs (for example, for a duration of 96 µs). The packet detector 104c computes the first peak autocorrelation value of the autocorrelation function in the noise period between the time points of 0 µs and 96 µs. The computed first peak autocorrelation value of the autocorrelation function in the noise period is stored in the packet detector 104c for future use (during the post noise period).

Figure 8A:
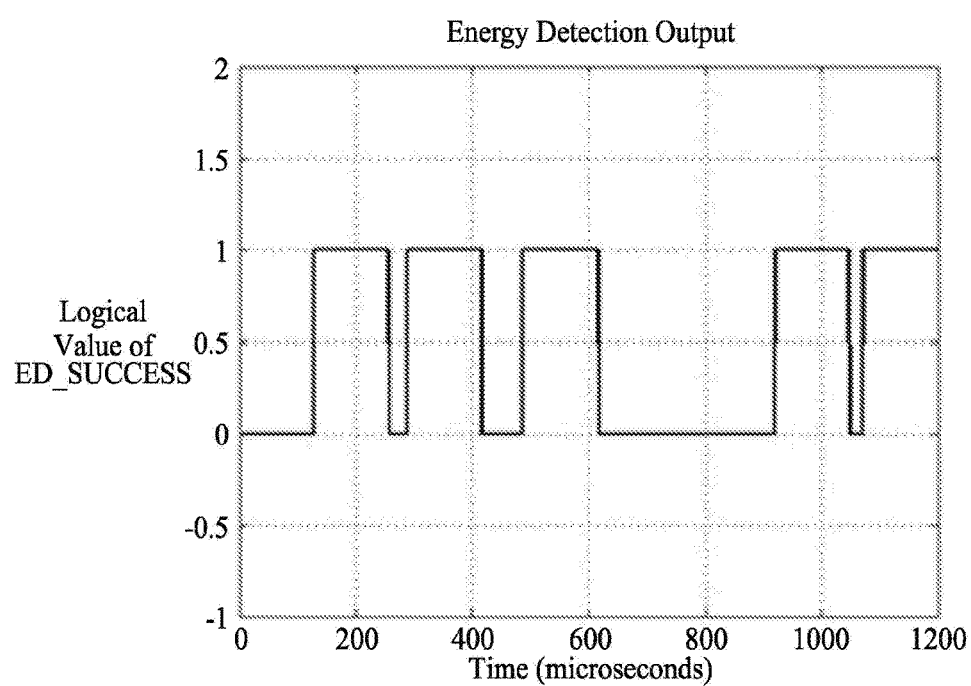
FIGS. 8A, 8B and 8C are graphs illustrating examples of energy detection (ED) during a noise period and a post noise period.
Figure 8B:
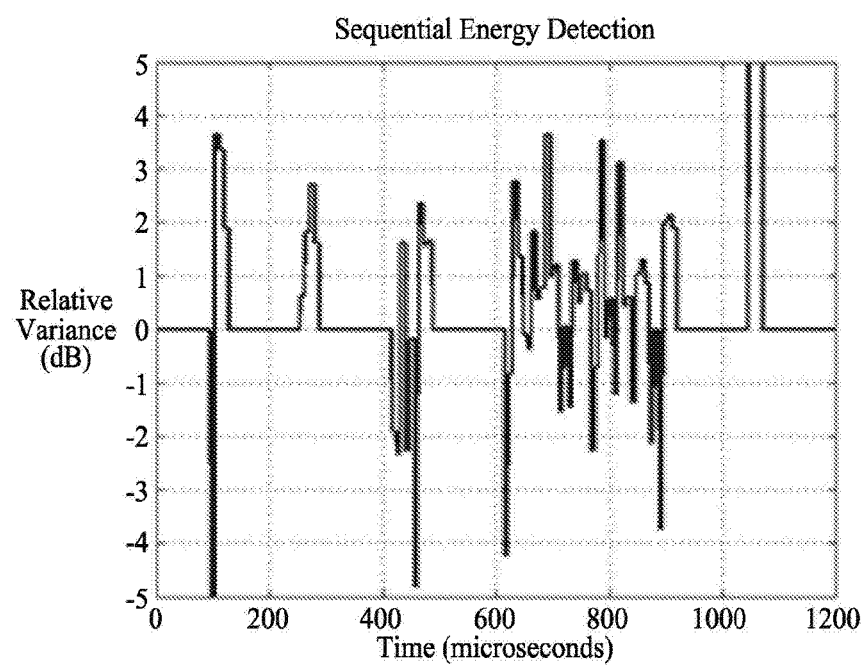
Figure 8C:
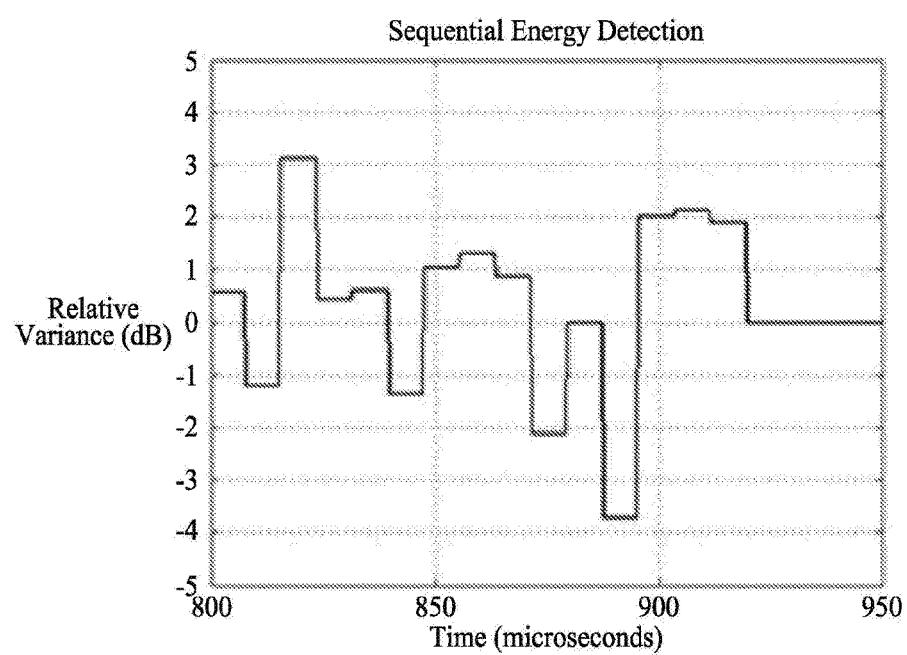

The energy detector 104b is enabled from the time point of 96 µs to a time point of 1024 µs. The energy detector 104b computes variances of the input sequence over time windows of an equal duration in the noise period and the signal period, as shown in FIGS. 8A through 8C. The energy detector 104b computes a relative variance value by computing a difference between each variance of each time window and a reference value in the noise period and the signal period. Further, the energy detector 104b determines whether the computed relative variance value exceeds a predetermined threshold for a predetermined number of consecutive time windows. From FIGS. 8A through 8C, the energy detector 104b utilizes three consecutive time windows (each window having a duration of 8 µs) in the signal period. The automatic gain controller 104e is enabled from the time point of 1024 µs to a time point of 1056 µs. The automatic gain controller 104e dynamically adjusts a gain of the input sequence when the signal period is initiated.

Further, the packet detector 104c is enabled for packet detection from the time point of 1056 µs to a time point of 1152 µs during the signal period. During the signal period, the packet detector 104c distinguishes an intended packet (for example, an IEEE 802.15.4q physical layer packet) from other packets, among received packets. From FIG. 5A, the packet detector 104c utilizes three preambles (for example, for a duration of 96 µs) for distinguishing the intended packet from the other packets. Further, the timing synchronizer is enabled from the time point of 1152 µs to a time point of 1256 µs. Also, a frame synchronizer is enabled from the time point of 1256 µs to a time point of 1320 µs.

Figure 6A:
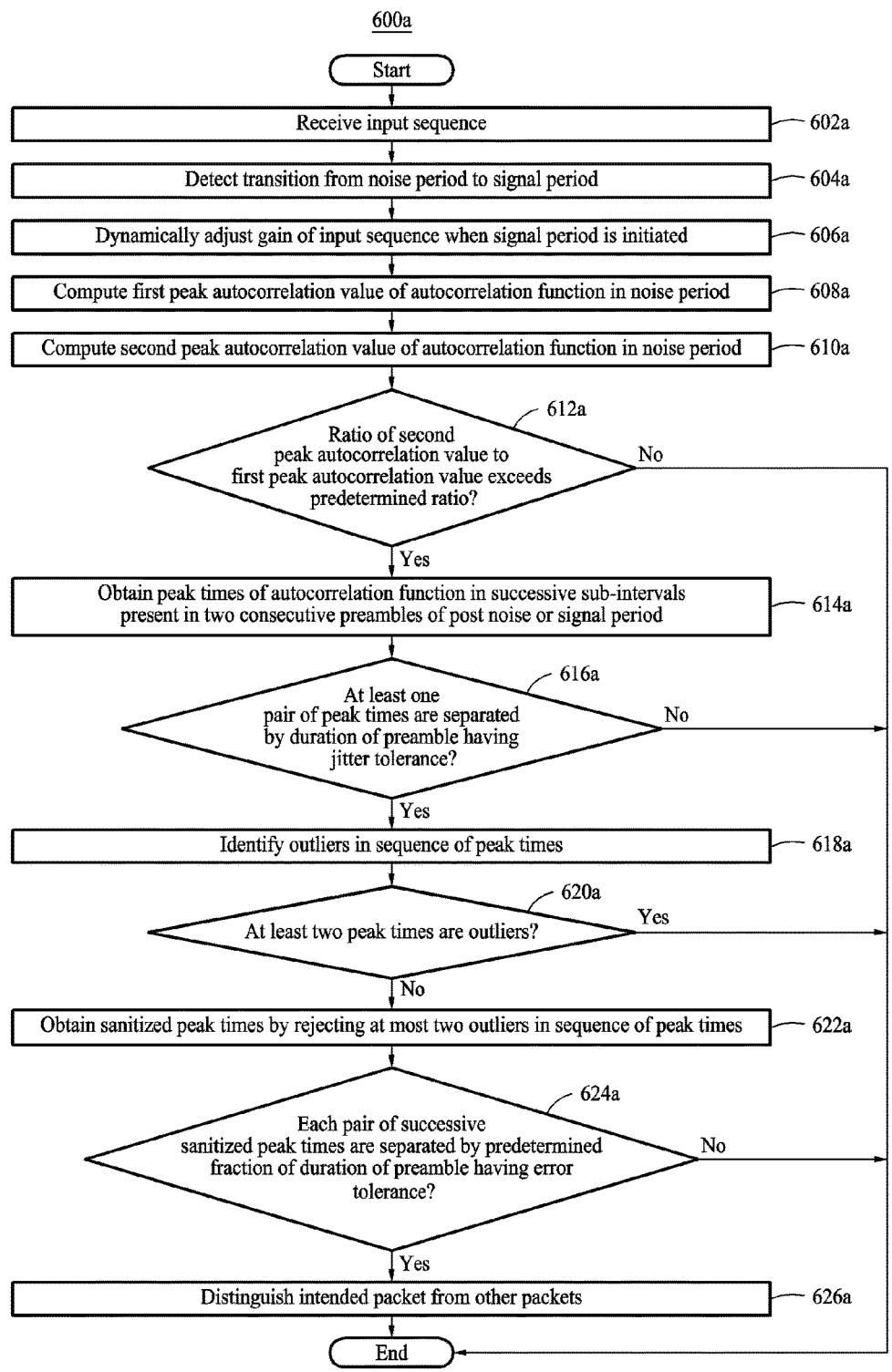
FIG. 6A is a flowchart illustrating an example of a method of distinguishing an intended packet from a plurality of packets.

FIG. 6A is a flowchart illustrating an example of a method 600a of distinguishing an intended packet from other packets, among received packets.

Referring to FIG. 6A, in operation 602a, the processor 104a receives an input sequence from the RFIC 102. The input sequence includes preambles and data.

In operation 604a, the energy detector 104b detects a transition from a noise period to a signal period. The energy detector 104b detects energy in order to significantly reduce a number of false alarms. The energy detector 104b determines conditions (as mentioned in Equations 1, 2 and 3 below) in the input sequence in order to detect the transition from the noise period to the signal period.

The energy detector 104b determines variances of the input sequence over time windows of an equal duration in the noise period. Further, the energy detector 104b computes a relative variance value by computing a difference between each variance of each time window and a reference value. The relative variance value is computed using Equations 1, 2 and 3 as mentioned below.

$$V(k+1) - V_{ref}(k) > Th_{ED} \quad \text{[Equation 1]}$$

$$V(k+2) - V_{ref}(k) > Th_{ED} \quad \text{[Equation 2]}$$

$$V(k+3) - V_{ref}(k) > Th_{ED} \quad \text{[Equation 3]}$$

In Equations 1 through 3, $Th_{ED}$ is an ED threshold and $V_{ref}(k)$ is a reference value for a variance in an ED window $k^{th}$.

In an example, a time budget for sequential ED is 24 µs (within a PHY preamble). An appropriate value of $Th_{ED}$ is 1.5 dB, for example.

The reference value $V_{ref}(k)$ is computed in an autoregressive manner.

In a first time window, $V_{ref}(1) = V(1)$. In the time window $k^{th}$, $V_{ref}(k) = 0.2 \times V(k) + 0.8 \times V_{ref}(k-1)$. Here, k>1.

However, the successive ED (for three time windows) described above may not distinguish between noise followed by an IEEE 802.15.4q physical layer packet and noise followed by a BT/BLE/GFSK/WLAN packet unless the packet detector 104c is triggered by the processor 104a.

In operation 606a, the automatic gain controller 104e dynamically adjusts a gain of the input sequence when the signal period is initiated.

In operation 608a, the packet detector 104c computes a first peak autocorrelation value of an autocorrelation function in the noise period.

In an example, a window includes output samples of the ADC 102a spanning 32 µs, for example, [t, t+32] µs. Assume that $x(\tau)$ is a baseband signal received at a time $\tau$ in µs. For example, $x(\tau)$ may be a continuous time analog signal which is given as an input to the ADC 102a. The packet detector 104c computes a first partial autocorrelation function, as indicated in Equation 4, below.

$$R(t) = \int_{\tau=t}^{t+2} x(\tau)x(\tau+2)d\tau + \int_{\tau=t+5}^{t+6} x(\tau)x(\tau+2)d\tau + \int_{\tau=t+8}^{t+9} x(\tau)x(\tau+2)d\tau + \int_{\tau=t+13}^{t+14} x(\tau)x(\tau+2)d\tau + \int_{\tau=t+16}^{t+17} x(\tau)x(\tau+2)d\tau + \int_{\tau=t+21}^{t+22} x(\tau)x(\tau+2)d\tau + \int_{\tau=t+24}^{t+25} x(\tau)x(\tau+2)d\tau + \int_{\tau=t+29}^{t+30} x(\tau)x(\tau+2)d\tau$$ [Equation 4]

In terms of ADC samples $X(k)=x(kT_s)$ and an oversampling ratio OSR, Equation 4 may be rewritten as Equation 5.

$$R(nT_s) = \sum_{m \in S} \sum_{k=1}^{OSR} X[n+k+(m-1) \times OSR]X[n+k+(m+1) \times OSR]$$ [Equation 5]

In Equation 5, $T_s$ is a sampling period of the ADC 102a and OSR is an oversampling ratio. For example, $T_s$=3 µs and OSR=3.

A maximum value of a function $R(t)$ for $t \in [0,64]$ µs is determined by sliding a time window in steps of (1/OSR) µs. Thus, for three oversampling ratios OSR, the time window is slid from [0.33, 32] µs to [0.67, 32.33] µs and so on up to [64.33, 96] µs. The first peak autocorrelation value over the slide duration is saved as a reference value $\rho$ for future use. Thus, $\rho = \max_{t \in [0, 64]\mu s} R(t)$.

In operation 610a, the packet detector 104c computes a second peak autocorrelation value of the autocorrelation function in the post noise period. For example, the post noise period is the signal period.

In an example, $t_r$ µs is a time at which the processor 104a triggers the packet detector 104c. The output samples of the ADC 102a are buffered over a window [t, t+32] µs and the samples are extracted from corresponding sub-intervals. The partial autocorrelation function R(t) is computed by the packet detector 104c. Further, the 32-µs window [t, t+32] µs is slid to right by 64 µs in steps of (1/OSR) µs=0.33 µs and the second peak autocorrelation value of the function R(t) is computed. The second peak autocorrelation value is computed using Equation 6.

$$\sigma = \max_{t \in [t_r, t_r+64]\mu s} R(t)$$ [Equation 6]

In operation 612a, the packet detector 104c determines whether a ratio of the second peak autocorrelation value $\sigma$ to a first peak autocorrelation value $\rho$ exceeds a predetermined ratio.

In operation 614a, the packet detector 104c obtains the peak times of the autocorrelation function in the successive sub-intervals present in the two consecutive preambles of the post noise or signal period.

The slide interval $[t_r, t_r+64]$ µs is partitioned into eight equal sub-intervals of 8 µs each. Thus, the sub-intervals are $[t_r, t_r+8]$ µs, $[t_r+8, t_r+16]$ µs, and so on, up to $[t_r+56, t_r+64]$ µs. Further, for every sub-interval, a peak of R(t) and its corresponding time are determined. More particularly, values of the peak times are determined using Equations 7, 8 and 9, provided below.

$$t_1^* = \operatorname*{argmax}_{t \in [t_r, t_r+8]\mu s} R(t)$$ [Equation 7]

$$t_2^* = \operatorname*{argmax}_{t \in [t_r+8, t_r+16]\mu s} R(t)$$ [Equation 8]

$$t_8^* = \operatorname*{argmax}_{t \in [t_r+56, t_r+64]\mu s} R(t)$$ [Equation 9]

In operation 616a, the packet detector 104c determines whether at least one pair of the peak times are separated by a duration of a preamble having a jitter tolerance. For example, the determination is made to check whether peak times corresponding to every fourth sub-interval are separated by a preamble duration (32 µs) within a jitter tolerance of (2×OSR/3) samples=0.678 µs. In terms of the peak times, the following conditions as given in Equations 10, 11, 12 and 13 are verified.

$(32-0.67)$ µs $\leq t_5^* - t_1^* \leq (32+0.67)$ µs [Equation 10]

$(32-0.67)$ µs $\leq t_6^* - t_2^* \leq (32+0.67)$ µs [Equation 11]

$(32-0.67)$ µs $\leq t_7^* - t_3^* \leq (32+0.67)$ µs [Equation 12]

$(32-0.67)$ µs $\leq t_8^* - t_4^* \leq (32+0.67)$ µs [Equation 13]

In operation 618a, the packet detector 104c identifies outliers in the sequence of peak times. Every peak time $t_k^*$ with respect to a left edge of an 8-µs slide window is adjusted with Equations 14, 15 and 16.

$\tau_1^* = t_1^* - t_r$ [Equation 14]

$\tau_2^* = t_2^* - (t_r+8)$ [Equation 15]

$\tau_8^* = t_8^* - (t_r+56)$ [Equation 16]

An un-sanitized sequence of relative peak times is as given in Equation 17.

$G_u = (\tau_1^*, \tau_2^*, \ldots, \tau_8^*)$ [Equation 17]

In operation 620a, the packet detector 104c determines whether at least two peak times are outliers.

In operation 622a, the packet detector 104c obtains sanitized peak times by rejecting at most two outliers in the sequence of peak times.

$\tau_m^*$ is a median value of a sequence $G_u$. In a case in which any relative peak time $\tau_k^*$ differs from the median value $\tau_m^*$ by more than 2 µs, a peak time is defined as an outlier and should be rejected. More particularly, the sanitized sequence of relative peak times is constructed according to Equation 18, as provided below.

$$G_s = (\tau_k^* : \tau_k^* \in G_u \text{ and } |\tau_k^* - \tau_m^*| \leq 2 \text{ μs}; k=1, \ldots, 8) \quad \text{[Equation 18]}$$

In operation 624a, the packet detector 104c determines whether each pair of successive sanitized peak times are separated by a predetermined fraction of a duration of a preamble having an error tolerance.

The values of the relative peak times in the sanitized sequence $G_s$ are examined to determine whether the relative peak times are reasonably close to each other. Re-indexing is performed on the values of the relative peak times, and $G_s$ is expressed using Equation 19.

$$G_s = (\tau_{k_1}^*, \tau_{k_2}^*, \ldots, \tau_{k_N}^*) \text{ where } N \leq 8 \quad \text{[Equation 19]}$$

For example, if $G_s(\tau_2^*, \tau_3^*, \tau_5^*, \tau_7^*)$, then $k_1=2$, $k_2=3$, $k_3=5$ and $k_4=7$. It is verified whether successive times are within an error tolerance of 1 μs. More specifically, the following determinations are performed with Equations 20, 21 and 22.

$$|\tau_{k_2}^* - \tau_{k_1}^*| \leq 1 \text{ μs} \quad \text{[Equation 20]}$$

$$|\tau_{k_3}^* - \tau_{k_2}^*| \leq 1 \text{ μs} \quad \text{[Equation 21]}$$

$$|\tau_{k_N}^* - \tau_{k_{N-1}}^*| \leq 1 \text{ μs} \quad \text{[Equation 22]}$$

In operation 626a, the packet detector 104c distinguishes the intended packet from the other packets. If all of the above conditions are satisfied, a fine check has passed and the packet detector 104c declares that an IEEE 802.15.4q NC preamble is reliably detected.

Figure 6B:
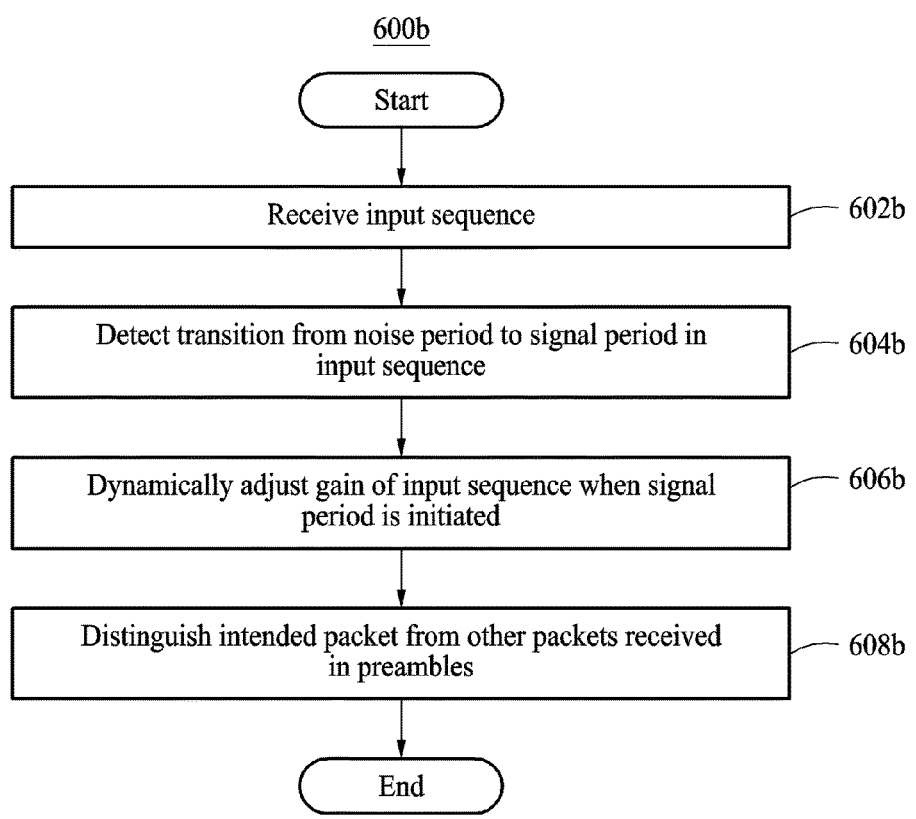
FIG. 6B is a flowchart illustrating an example of a method of sequencing various components to distinguish an intended packet from a plurality of packets.

FIG. 6B is a flowchart illustrating an example of a method 600b of sequencing various components for distinguishing an intended packet from other packets, among received packets.

Referring to FIG. 6B, in operation 602b, the processor 104a receives an input sequence from the RFIC 102. The input sequence includes preambles and data.

In operation 604b, the energy detector 104b detects a transition from a noise period to a signal period in the input sequence.

In operation 606b, the automatic gain controller 104e dynamically adjusts a gain of the input sequence when the signal period is initiated.

In operation 608b, the packet detector 104c distinguishes an intended packet from the other packets, among the packets received in the preambles.

Figure 6C:
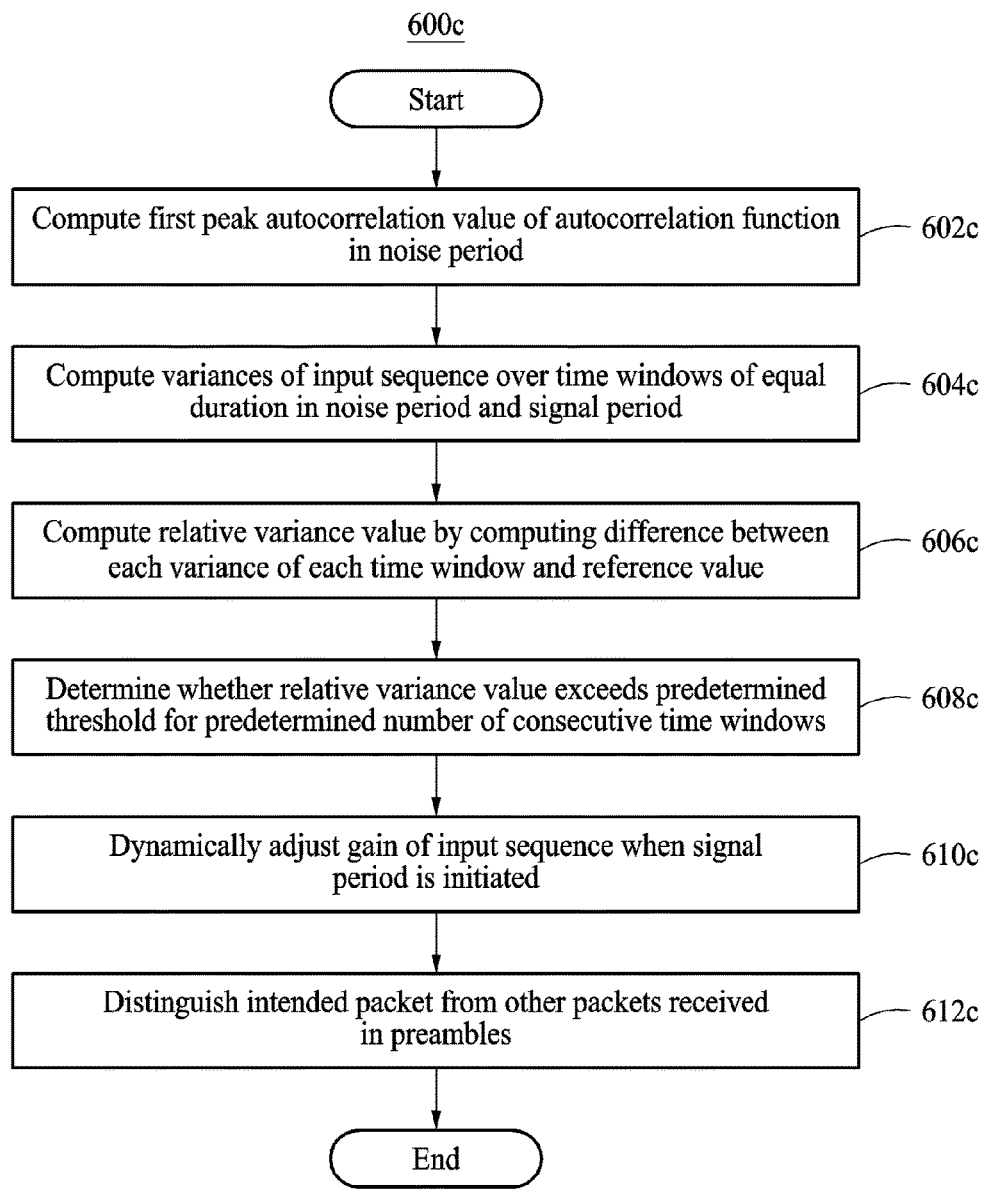
FIG. 6C is a flowchart illustrating an example of a method of sequencing various components to distinguish an intended packet from a plurality of packets.

FIG. 6C is a flowchart illustrating an example of a method 600c of sequencing various components for distinguishing an intended packet from other packets, among received packets. The time instances at which the various components are enabled for distinguishing the intended packet from of the other packets are illustrated in FIG. 5A, and hence only the sequencing of the components is described herein.

Referring to FIG. 6C, in operation 602c, the packet detector 104c computes a first peak autocorrelation value of an autocorrelation function in a noise period.

In operation 604c, the energy detector 104b computes variances of the input sequence over time windows of an equal duration in the noise period and a signal period.

In operation 606c, the energy detector 104b computes a relative variance value by computing a difference between each variance of each time window and a reference value.

In operation 608c, the energy detector 104b determines whether the relative variance value exceeds a predetermined threshold for a predetermined number of consecutive time windows.

In operation 610c, the automatic gain controller 104e dynamically adjusts a gain of the input sequence when the signal period is initiated.

In operation 612c, the packet detector 104c distinguishes an intended packet from the other packets received in the preambles.

Figure 6D:
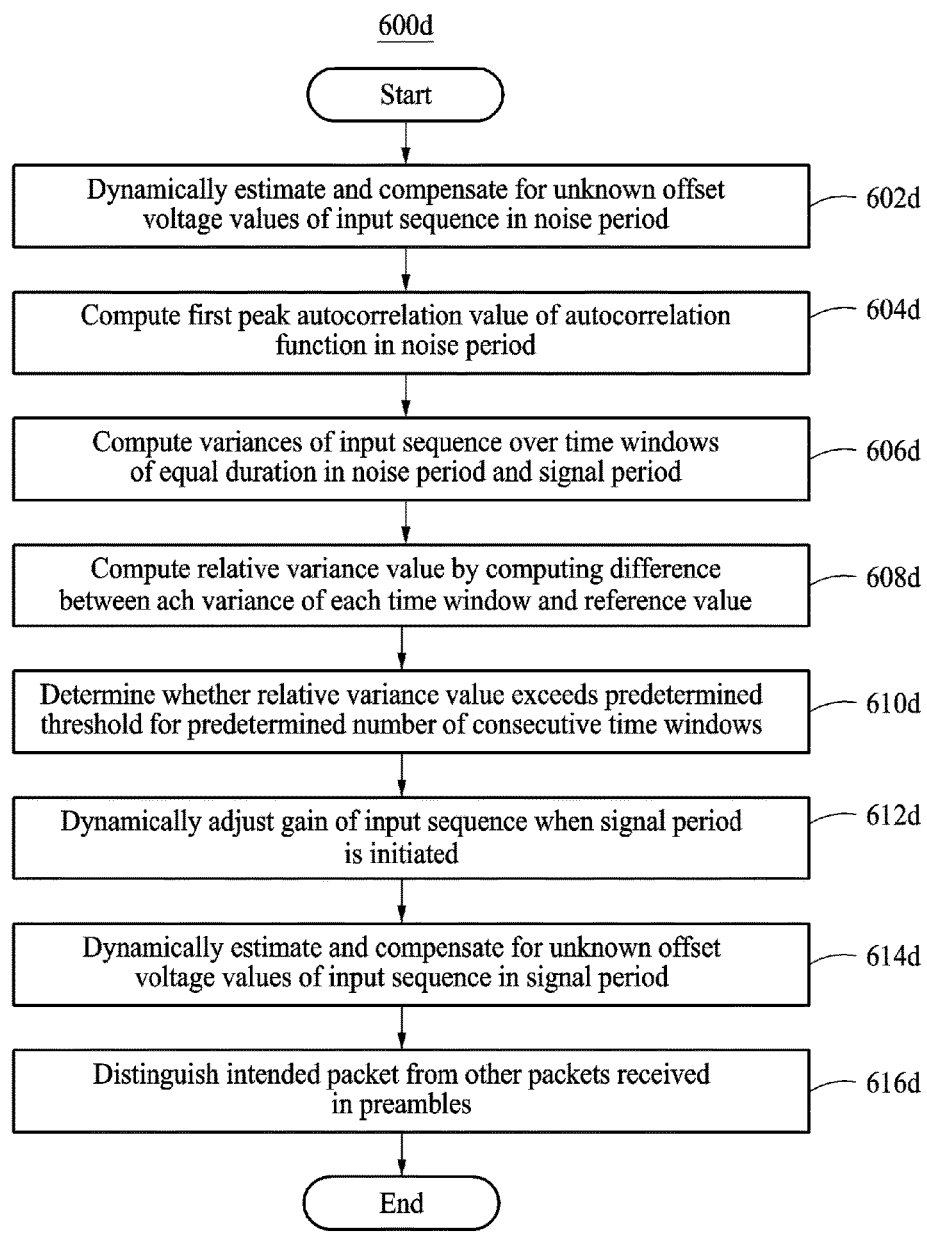
FIG. 6D is a flowchart illustrating an example of a method of sequencing various components to distinguish an intended packet from a plurality of packets.

FIG. 6D is a flowchart illustrating an example of a method 600d of sequencing various components for distinguishing an intended packet from other packets, among received packets.

Referring to FIG. 6D, in operation 602d, the direct current offset compensator 102b dynamically estimates and compensates for unknown offset voltage values of an input sequence in a noise period. In the noise period, the direct current offset estimator 104d and the packet detector 104c are enabled for performing computations. The direct current offset estimator 104d is enabled between a time point of 0 μs and a time point of 12 μs, and the packet detector is enabled from the time point of 12 μs to a time point of 108 μs (for example, for a duration of 96 μs), as depicted in FIG. 5B.

For example, the direct current offset compensator 102b dynamically compensates for unknown offset voltage values $B_I$ and $B_Q$ of the input sequence in the noise period between the time point of 12 μs and the time point of 1000 μs.

In operation 604d, the packet detector 104c computes a first peak autocorrelation value of an autocorrelation function in the noise period. The packet detector 104c computes the first peak autocorrelation value of the autocorrelation function in the noise period between the time point of 12 μs and a time point of 108 μs. The computed first peak autocorrelation value of the autocorrelation function in the noise period is stored in the packet detector 104c for future use (during a post noise or signal period).

In operation 606d, the energy detector 104b computes variances of the input sequence over the time windows of an equal duration in the noise period and the signal period. For this operation, the energy detector 104b is enabled from the time point of 108 μs to a time point of 1024 μs. In operation 608d, energy detector 104b computes a relative variance value by computing a difference between each variance of each time window and a reference value. The energy detector 104b computes the relative variance value by computing the difference between each variance of each time window and the reference value in the noise period and the signal period.

In operation 610d, the energy detector 104b determines whether the relative variance value exceeds a predetermined threshold for a predetermined number of consecutive time windows.

In operation 612d, the automatic gain controller 104e dynamically adjusts a gain of the input sequence when the signal period is initiated. For this operation, the automatic gain controller 104e is enabled from the time point of 1024 μs to a time point of 1056 μs.

In operation 614d, the direct current offset estimator 104d dynamically estimates and compensates for unknown offset voltage values of the input sequence in the signal period. For this operation, the direct current offset estimator 104d is enabled from the time point of 1056 μs to a time point of 1080 μs (for example, for a duration of 24 μs). In the signal period, the direct current offset compensator 102b compensates for the unknown offset values from 1080 μs until the end of the packet.

In operation 616d, the packet detector 104c distinguishes an intended packet from other packets, among packets received in preambles. The packet detector 104c is enabled for packet detection from the time point of 1080 μs to a time point of 1176 µs during the signal period. During the signal period, the packet detector 104c distinguishes the intended packet (for example, an IEEE 802.15.4q physical layer packet) from the other packets. As illustrated in FIG. 5B, the packet detector 104c utilizes three preambles (for example, for a duration of 96 µs) for distinguishing the intended packet from the other packets.

Figure 7:
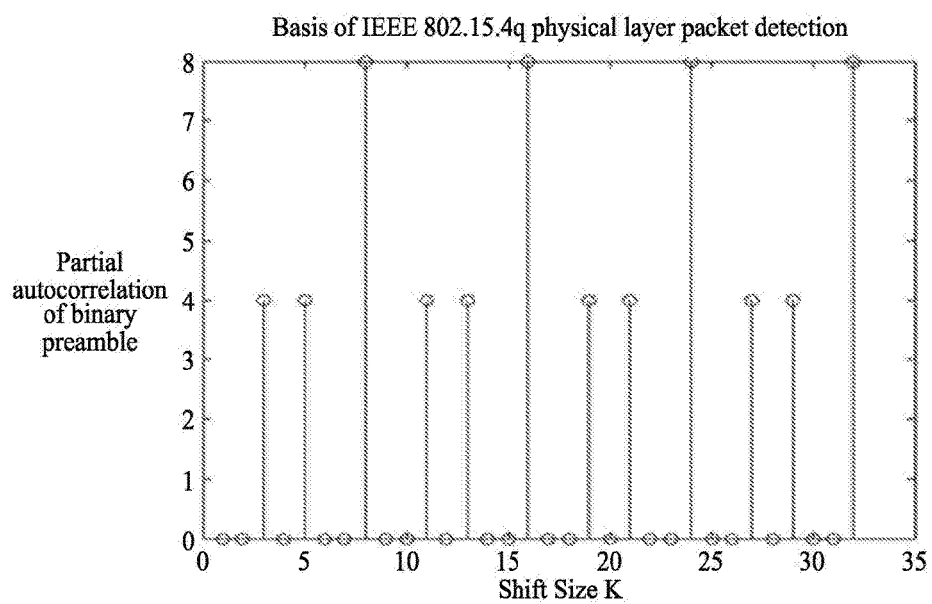
FIG. 7 is a graph illustrating an example of a partial autocorrelation of an NC preamble sequence.

FIG. 7 is a graph illustrating an example of a partial autocorrelation of an NC preamble sequence.

A basic 32-chip ternary preamble sequence present in an 802.15.4q physical layer packet is given by Equation 23.

$$T_0 = [1\ 0\ -1\ 0\ 0\ -1\ 0\ -1,1\ 0\ 1\ 0\ 0\ -1\ 0\ 1,1\ 0\ 1\ 0\ 0\ -1\ 0\ 1,-1\ 0\ 1\ 0\ 0\ 1\ 0\ 1]$$ [Equation 23]

However, with NC reception, only a binary preamble sequence is considered. When only the binary sequence is considered, $B_0$ is given by Equation 24.

$$B_0 = [1\ 0\ 1\ 0\ 0\ 1\ 0\ 1,1\ 0\ 1\ 0\ 0\ 1\ 0\ 1,1\ 0\ 1\ 0\ 0\ 1\ 0\ 1,1\ 0\ 1\ 0\ 0\ 1\ 0\ 1]$$ [Equation 24]

It is considered that $B_0 = [A,A,A,A]$, where $A = [1\ 0\ 1\ 0\ 0\ 1\ 0\ 1]$ is an 8-µs sub-preamble that constitutes the NC preamble $B_0$. $B_k$ is the sequence $B_0$ cyclically shifted k elements to the right. For example, $B_2$ is given by Equation 25.

$$B_2 = [0\ 1\ 1\ 0\ 1\ 0\ 0\ 1,0\ 1\ 1\ 0\ 1\ 0\ 0\ 1,0\ 1\ 1\ 0\ 1\ 0\ 0\ 1,0\ 1\ 1\ 0\ 1\ 0\ 0\ 1]$$ [Equation 25]

For the binary preamble sequence $B_0$, "special terms" are defined as those terms that, when multiplied by terms two positions to the right, yield a value of unity. A corresponding "special index set" is given by Equation 26.

$$S = \{1,6,9,14,17,22,25,30\}$$ [Equation 26]

The packet detector 104c determines whether an incoming physical layer packet is an IEEE 802.15.4q physical layer packet. If the packet detector 104c determines that the incoming physical layer packet is the IEEE 802.15.4q physical layer packet, the packet detector 104c needs to determine a starting index of the NC preamble $B_0$.

The packet detector 104c computes an autocorrelation value of the input sequence received from the ADC 102a (at "special indices" with right shift size of two chips). For the sequence $B_k$, a sum of products is computed as given by Equation 27.

$$\eta = B_k(1)B_k(3) + B_k(6)B_k(8) +$$ [Equation 27]
$$B_k(9)B_k(11) + B_k(14)B_k(16) + B_k(17)B_k(19) +$$
$$B_k(22)B_k(24) + B_k(25)B_k(27) + B_k(30)B_k(32)$$

In Equation 27, $B_k(m) \in \{0,1\}$ is an $m^{th}$ term of the binary preamble sequence $B_k$. A quantity $\eta$ is referred to as a "partial autocorrelation function". The above computation of $\eta$ exhibits peaks with a periodicity of 8 chips (which is equivalent to 8 µs). A peak value of autocorrelation occurs for $B_0$, $B_8$, $B_{16}$, and $B_{24}$, but not for other values of cyclic shifts, such as $B_1$ and $B_3$, as shown in FIG. 7.

FIGS. 8A through 8C are graphs illustrating examples of ED during a noise period and a post noise period.

Control signal output of the energy detector 104b during the noise period and the signal period is shown in FIG. 8A.

In FIG. 8A, an x axis corresponds to a time t in µs, while a y axis corresponds to a value of ED_SUCCESS. From FIG. 8A, it should be noted that ED_SUCCESS is high (logic "1") for five times during an interval [0, 1200] µs.

A corresponding relative variance with respect to the time is shown in FIG. 8B, where $V(k+m) - V_{ref}(k)$. It should be noted that an ED window $k^{th}$ corresponds to a time interval $[(k-1)T, kT]$, where T=8 µs is a duration of the ED window. An ED threshold is $Th_{ED}$=1.5 dB.

For example, an operation of the energy detector 104b from a time point of 888 µs to a time point of 920 µs is described herein. A relative variance during this time interval is observed clearly from FIG. 8C. During the ED window [888,896] µs, a value of $V_{ref}(k)$ is −12.97 dBm. An FSM of the energy detector 104b is at a state ED_COMPUTE_VAR. During the ED window [896,904] µs, the value of $V(k+1)$=−10.97 dBm. Thus, the relative variance is 2.00 dB, which is also shown in FIG. 8C. Since the relative variance exceeds the ED threshold of 1.5 dB, the FSM of the energy detector 104b transitions to ED_HIGH_1. During a subsequent ED window [904,912] µs, $V(k+2)$=−10.85 dBm. The relative variance is 2.12 dB, which exceeds the ED threshold. Thus, the FSM of the energy detector 104b transitions to ED_HIGH_2. During a subsequent ED window [912,920] µs, $V(k+3)$=−11.07 dBm. The relative variance of 1.90 dB again exceeds the ED threshold. Hence, the FSM of the energy detector 104b transitions to ED_END, and the output control signal ED_SUCCESS is set to be high (logic "1"). Further, the processor 104a triggers the automatic gain controller 104e at a time 920 µs.

FIGS. 8D through 8I are graphs illustrating examples of PD during a noise period and a post noise period. An illustration of the efficacy of IEEE 802.15.4q NC preamble detection is provided. A scenario in which 1000 µs of a noise interval is followed by an 802.15.4q PHY received signal. A BB modulation scheme is a 1/1 TASK (data rate D1) with an SNR of 13 dB.

Figure 8D:
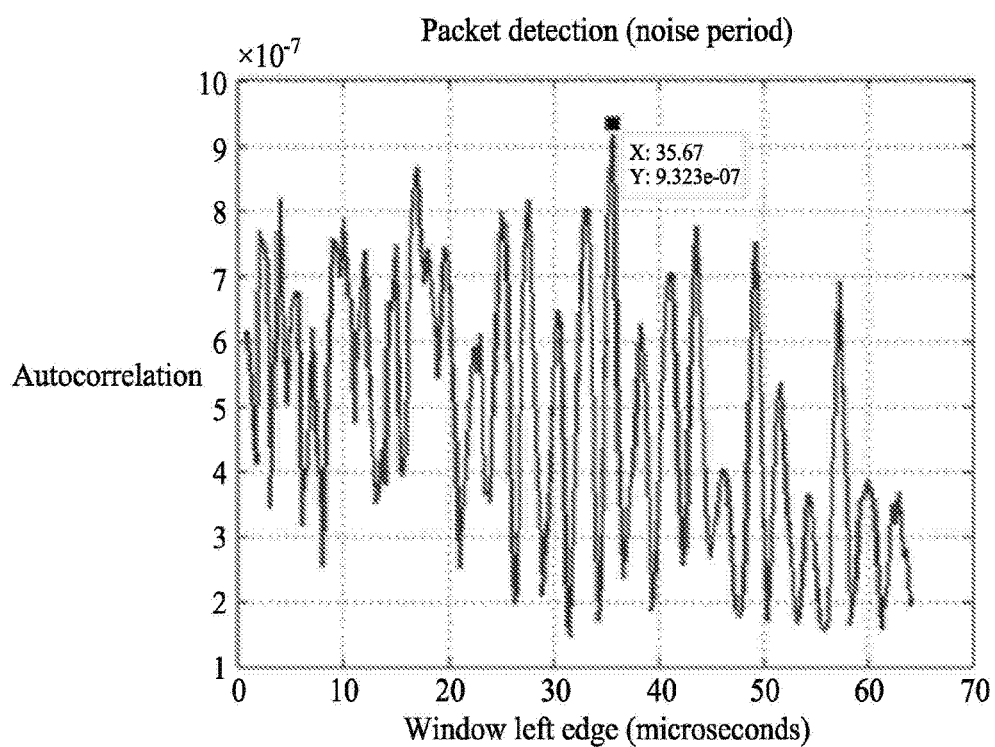
FIGS. 8D, 8E, 8F, 8G, 8H and 8I are graphs illustrating examples of packet detection (PD) during a noise period and a post noise period.

An output of the packet detector 104c during an initial noise period of [0, 96] µs is shown in FIG. 8D. An x axis corresponds to a window left edge t, while a y axis corresponds to a value of a partial autocorrelation function R(t). After sliding a 32-µs window by 64 µs, a peak value of R(t) is $\rho = 9.32 \times 10^{-7}$. This is saved as a reference value for a coarse check. Output control signals are PD_NOI_DONE=1 and PD_SIG_DONE=0.

Figure 8E:
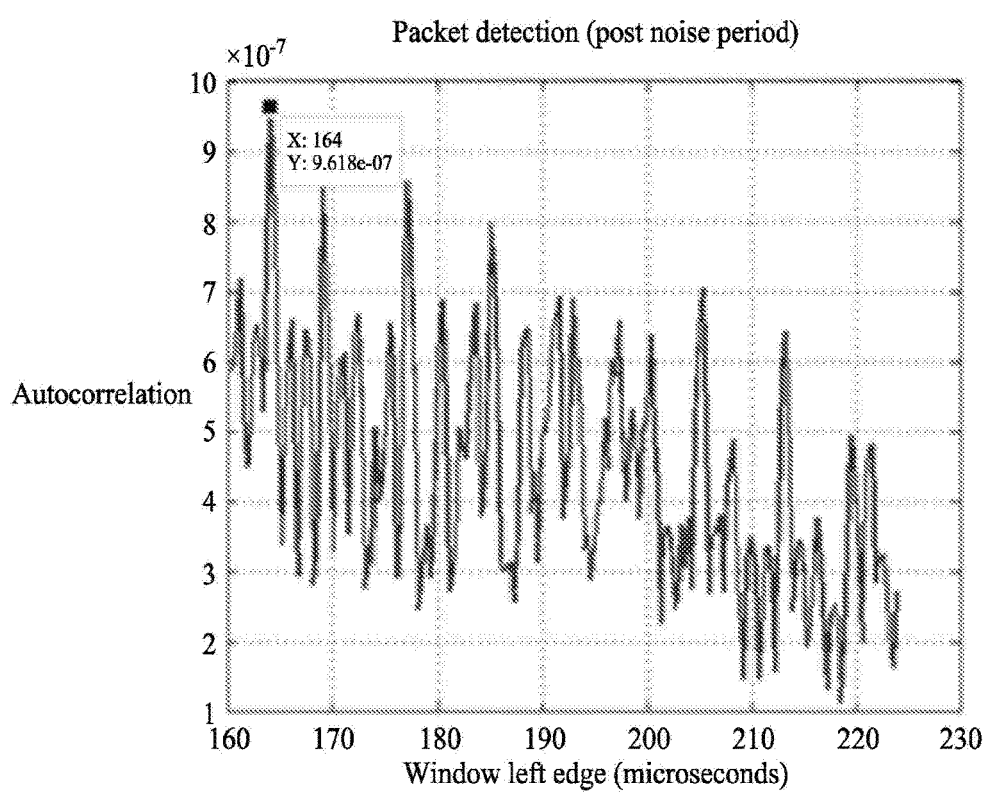

The packet detector 104c is triggered by the processor 104a at $t_r$=160 µs, during the "post noise period". A plot of R(t) for $t \in [160,224]$ µs is shown in FIG. 8E. A peak value is $\sigma = 9.61 \times 10^{-7}$. Since $\sigma/\rho < 2$, a basic check (ratio condition) has failed and an IEEE 802.15.4q packet is not detected. Since $\sigma$ is greater than $\rho$, the reference value is increased to $\rho = 9.61 \times 10^{-7}$. Output control signals are PD_SIG_DONE=1 and PD_SUCCESS=0. The processor 104a triggers the energy detector 104b.

Figure 8F:
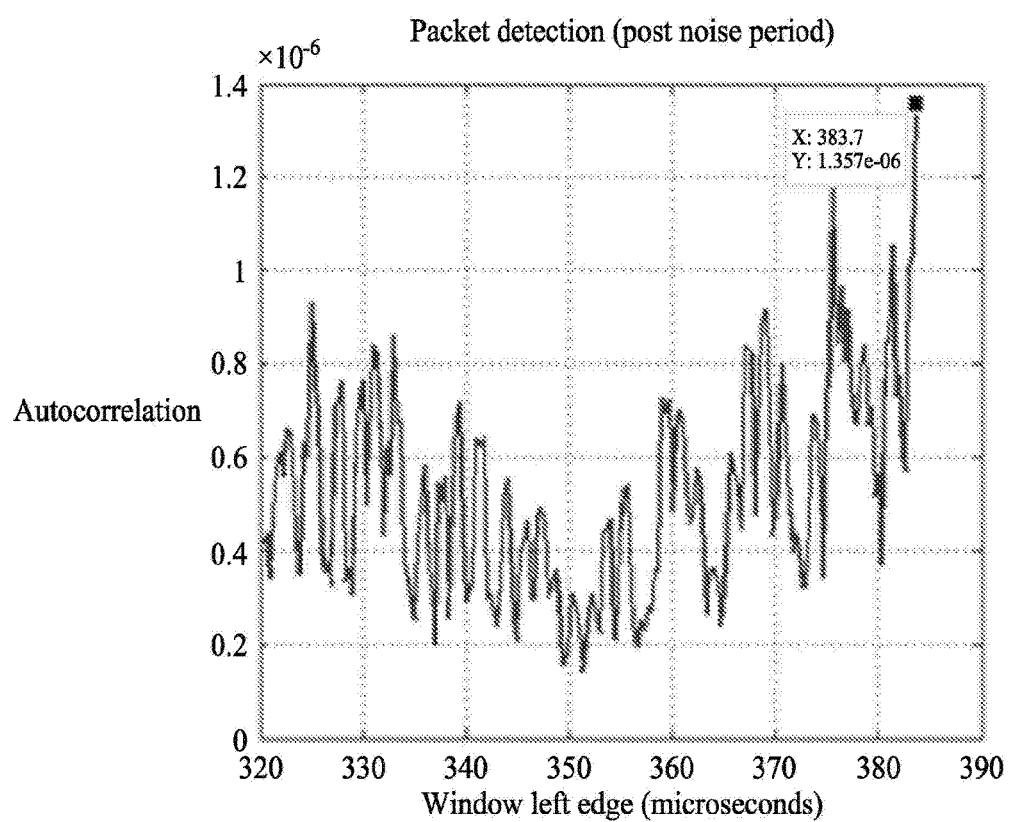
Figure 8G:
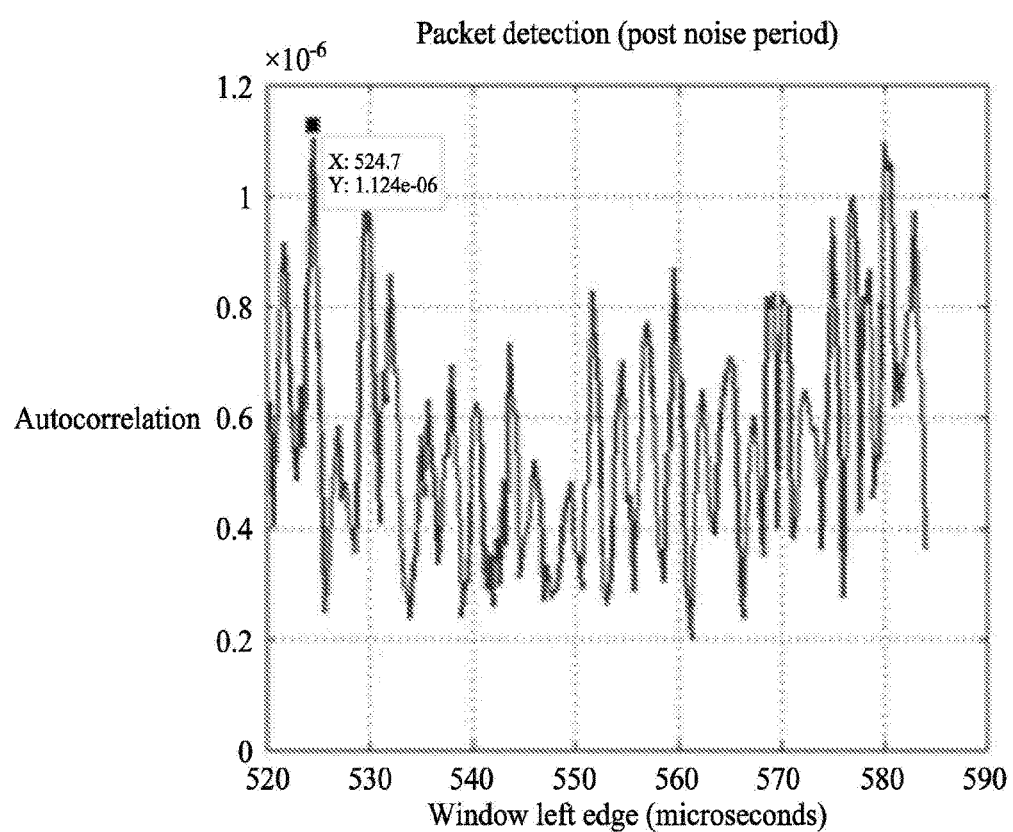

The packet detector 104c is triggered by the processor 104a at $t_r$=320 µs. A plot of R(t) for $t \in [320,384]$ µs is shown in FIG. 8F. A peak value is $\sigma = 1.35 \times 10^{-6}$. Since $\sigma/\rho < 2$, a basic check fails. Since $\sigma > \rho$, $\rho = 1.35 \times 10^{-6}$ is updated and an IEEE 802.15.4q packet is not detected. Output control signals are PD_SIG_DONE=1 and PD_SUCCESS=0. The energy detector 104b is activated by the processor 104a.

The packet detector 104c is triggered by the processor 104a for a third time at $t_r$=520 µs. In a plot of autocorrelation vs. slide window left edge t in FIG. 8G, a peak value is $\sigma = 1.12 \times 10^{-6}$. Since $\sigma/\rho < 2$, a basic check fails. Since $\sigma < \rho$, there is no need to update the value of $\rho$. Output control signals are PD_SIG_DONE=1 and PD_SUCCESS=0. The processor 104a triggers the energy detector 104b.

Figure 8H:
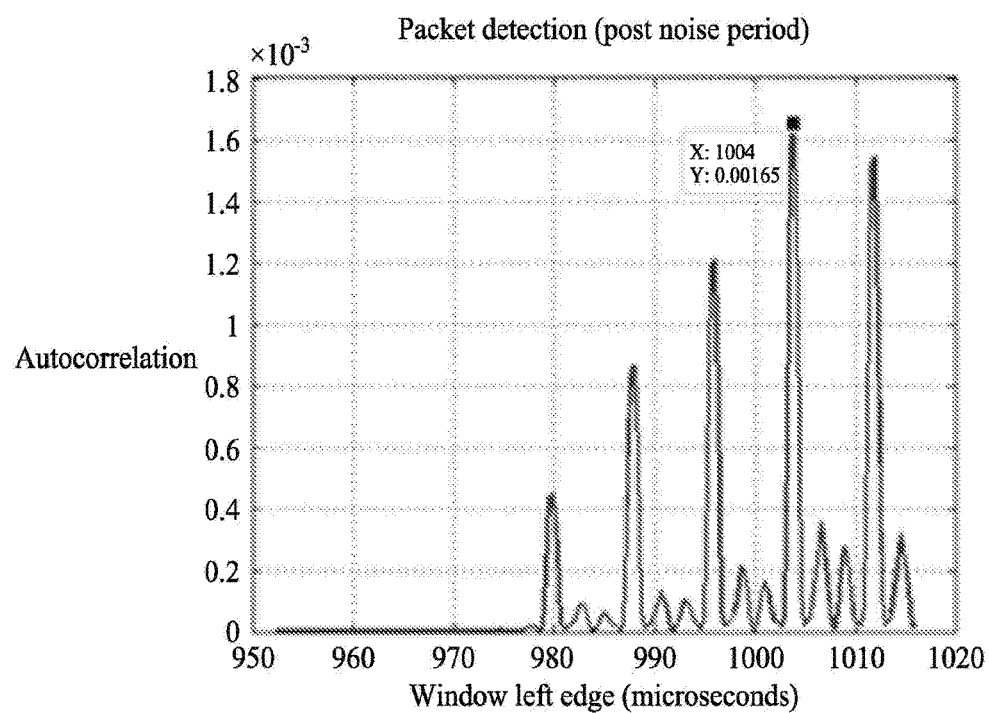

After this, the packet detector 104b is triggered by the processor 104a at $t_r$=952 µs. FIG. 8H shows a plot of autocorrelation R(t) for $t \in [952,1116]$ µs. A peak AC value is $\sigma=1.5\times10^{-3}$. Since $\sigma/\rho>2$, a basic check has passed and a coarse check is performed. A slide interval is partitioned into eight equal sub-intervals of 8 μs each: [952,960] μs, [960, 968] μs, and so on up to [1108,1116] μs. For these sub-intervals, the respective peak times are obtained as $t_1^*=953$ μs, $t_2^*=961$ μs, $t_3^*=974.67$ μs, $t_4^*=980$ μs, $t_5^*=988$ μs, $t_6^*=996$ μs, $t_7^*=1004$ μs, and $t_8^*=1.012$ μs. Since $31.33$ μs$\leq t_8^*-t_4^*\leq 32.61$ μs, a coarse check has passed and a method proceeds with an outlier check. For this, an initial sequence of relative peak times is obtained as $G_u=(\tau_1,\tau_3^*,\ldots,\tau_8^*)=(1,1,6.67,4,4,4,4,4)$ μs. A median value is $\tau_m^*=4$ μs. A sanitized sequence of relative peak times is $G_s=(4,4,4,4,4)$ μs, since remaining three values differ from the median value by more than 2 μs. Since at least two outliers are found, an outlier check fails. Hence, an IEEE 802.15.4q PHY packet has still not been detected. Output control signals are PD_SIG_DONE=1 and PD_SUCCESS=0. The energy detector 104b is again triggered by the processor 104a.

Figure 8I:
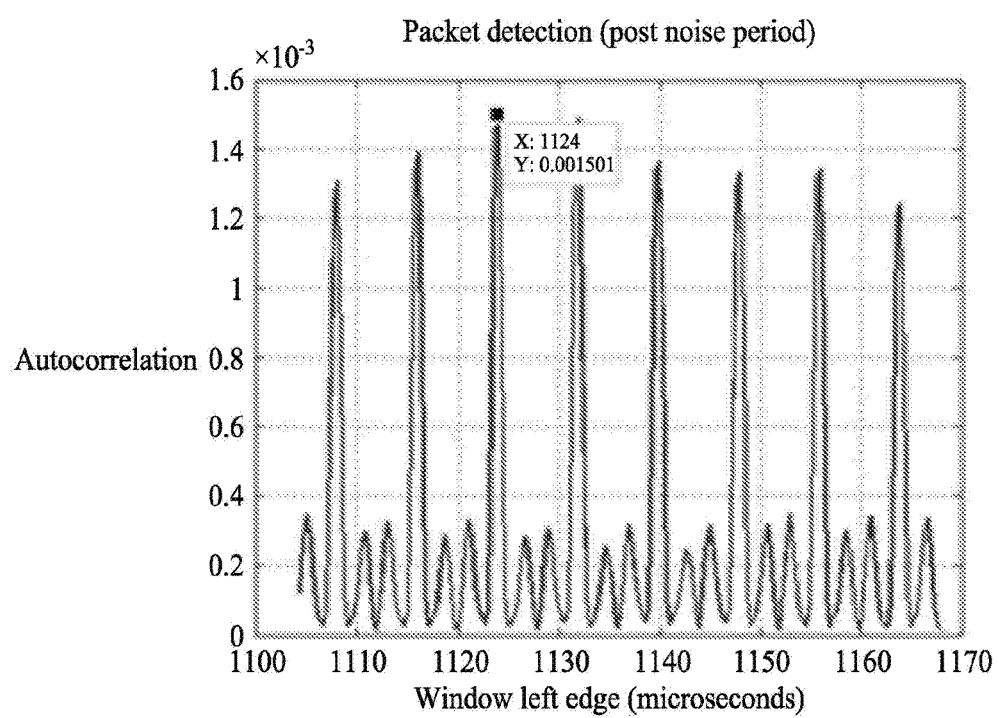

The packet detector 104c is triggered by the processor 104a at $t_r=1104$ μs. FIG. 8I shows a plot of autocorrelation R(t) for t∈[1104,1168] μs. A peak value is $\sigma=1.5\times10^{-3}$. Since $\sigma/\rho>2$, a basic check is cleared and a coarse check is determined. After partitioning the slide interval into eight sub-intervals of 8 μs each, a sequence of peak times is $(t_1^*,t_2^*,\ldots,t_8^*)=(1108,1116,1124,1132,1140,1148,1156,1164)$ μs.

Since $t_5^*-t_1^*=32$ μs, a coarse check passes and an outlier check stage is performed. An initial sequence of relative peak times is $G_u=(\tau_1^*,\tau_2^*,\ldots,\tau_8^*)=(4,4,4,4,4,4,4,4)$ μs. Since all values are equal, there is no outlier and the sanitized sequence is equal to the initial sequence. Hence, $G_s=(4,4,4,4,4,4,4,4)$ μs. Since an outlier check has passed, a fine check is performed. Trivially, all successive relative peak times in $G_s$ are within 1 μs of each other. Thus, the fine check has passed. Therefore, an IEEE 802.15.4q NC preamble (physical layer packet) has been detected. Output control signals are PD_SIG_DONE=1 and PD_SUCCESS=1.

Figure 9:
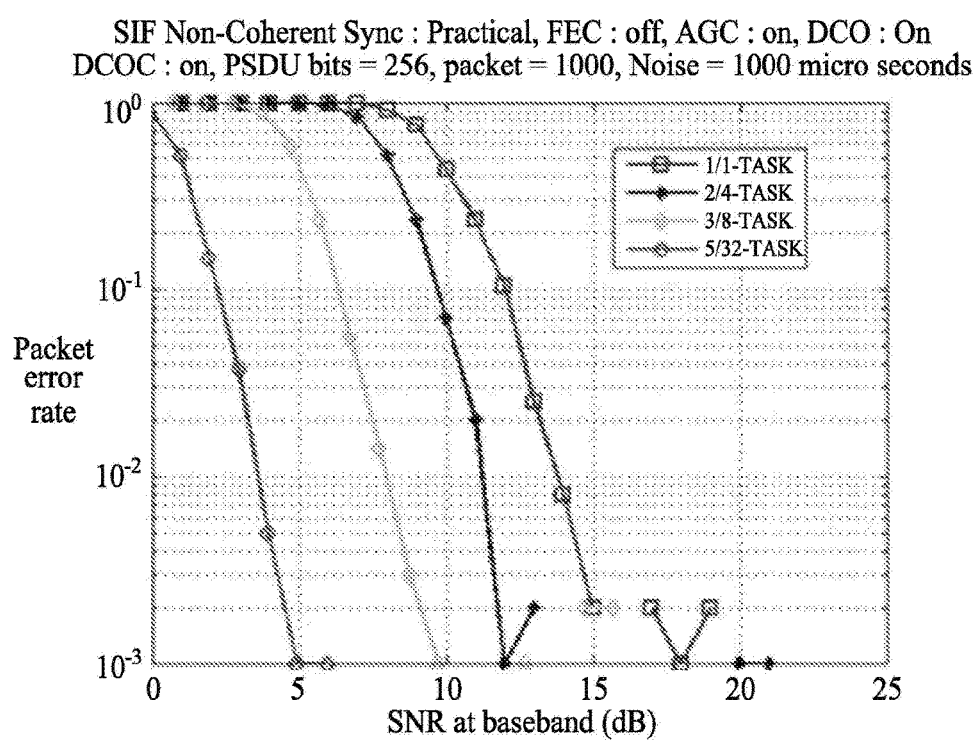
FIG. 9 is a graph illustrating an example of a variation of a packet error rate (PER) with a baseband signal-to-noise ratio (SNR) performance of an SIF NC receiver with a non-coded IEEE 802.15.4q physical layer packet.

FIG. 9 is a graph illustrating an example of a variation of a packet error rate (PER) with a baseband SNR performance of an SIF NC receiver with a non-coded IEEE 802.15.4q physical layer packet.

The PER with the SNR performance for various data rates with all outer receiver methods (ED, PD, AGC and DCOC) turned ON is measured. The graph of FIG. 9 shows the performance without FEC and interleaving on a PSDU portion of a packet.

Figure 10:
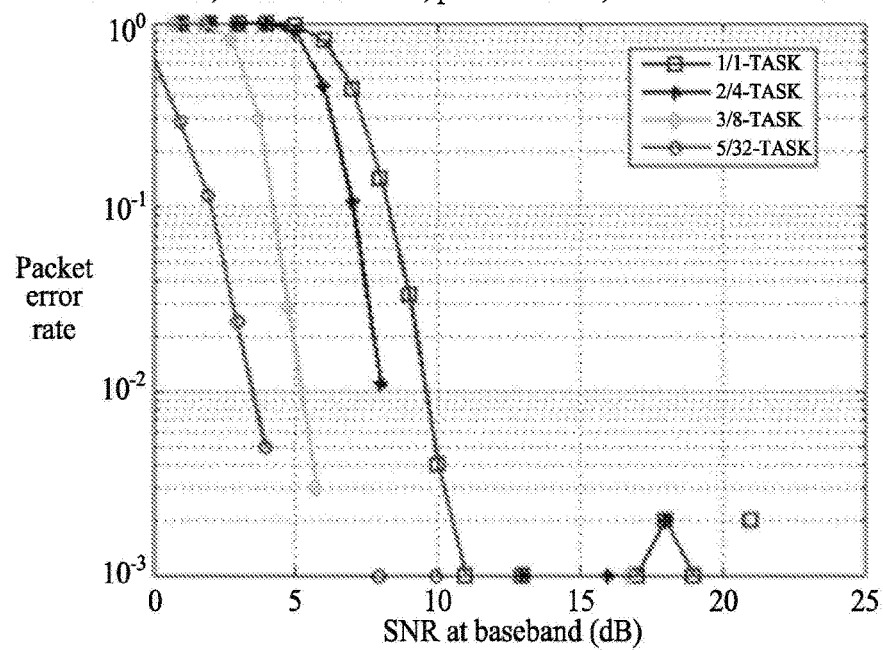
FIG. 10 is a graph illustrating an example of a variation of a PER with a baseband SNR performance of an SIF NC receiver with a coded IEEE 802.15.4q physical layer packet.

FIG. 10 is a graph illustrating an example of a variation of a PER with a baseband SNR performance of an SIF NC receiver with a coded IEEE 802.15.4q physical layer packet.

Corresponding sensitivity values for a 1% PER are listed in Table 3. It is observed that a receiver sensitivity for a data rate D1 is 13.9 dB, which is consistent with results in the existing systems. As expected, a higher value of a PSDU spreading factor leads to a lower value of the receiver sensitivity. Also, FEC and interleaving improve the sensitivity by about 3 dB, except for a 5/32 TASK.

TABLE 3

| Baseband | BB receiver sensitivity at 1% PER (dB) | |
| --- | --- | --- |
| MCS | Without FEC and Interleaving | With FEC and Interleaving |
| 1/1 TASK | 13.9 | 9.8 |
| 2/4 TASK | 11.5 | 8.1 |

TABLE 3-continued

| Baseband | BB receiver sensitivity at 1% PER (dB) | |
| --- | --- | --- |
| MCS | Without FEC and Interleaving | With FEC and Interleaving |
| 3/8 TASK | 8.1 | 5.5 |
| 5/32 TASK | 3.8 | 3.7 |

Figure 11:
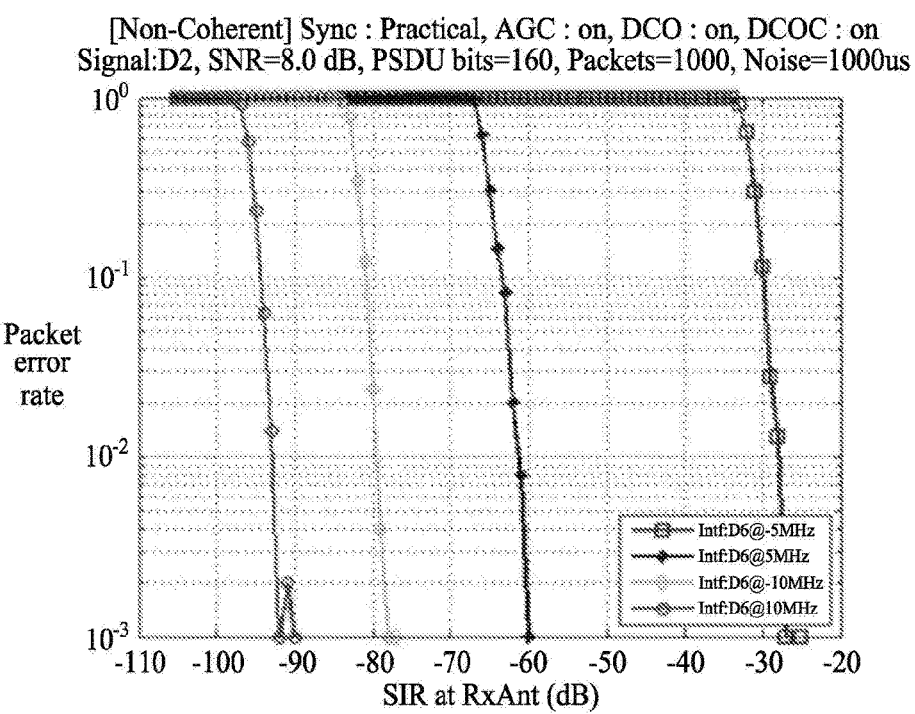
FIG. 11 is a graph illustrating an example of a variation of a plot of a PER with a signal-to-interference ratio (SIR) for various frequency separations between interfering and designed signals.

FIG. 11 is a graph illustrating an example of a variation of a plot of a PER with a signal-to-interference ratio (SIR) for various frequency separations between interfering and designed signals.

The variation of the PER with the SIR sweeps to determine adjacent channel interference (ACI) and alternate channel interference (ALCI) rejection ratios. The ACI is defined as interference that is 5 MHz away from a center frequency of an intended signal. Thus, for a signal having a center frequency of 80 MHz, the ACI may have a center frequency of 75 MHz or 85 MHz. The ALCI is defined as interference that is 10 MHz away from the center frequency of the signal. Thus, for the signal having the center frequency of 80 MHz, the ALCI may have a center frequency of 70 MHz or 90 MHz.

In order to quantify a maximum tolerable interference power for a fixed value of a signal power, for a given data rate, the fixed value of the signal power is taken to be 3 dB higher than a BB sensitivity of the receiver (as shown in the Table 4). Therefore, to determine an ACI or ALCI rejection ratio, an SNR is fixed and an SIR is increased till a PER goes below 1%. The rejection ratio is defined as a negative value of the SIR at which the PER goes below 1% in the PER vs. SIR sweep.

TABLE 4

| Baseband | Receiver sensitivity at 1% PER (dB) | |
| --- | --- | --- |
| MCS | Without FEC and Interleaving | With FEC and Interleaving |
| 1/1 TASK | 13.9 | 9.8 |
| 2/4 TASK | 11.5 | 8.1 |
| 3/8 TASK | 8.1 | 5.5 |
| 5/32 TASK | 3.8 | 3.7 |

FIG. 11 illustrates an example of ACI and ALCI performance for a data rate D2 (2/4 TASK). A desired signal has an SNR of 20 dB at an Rx antenna. An undesired interference signal with a data rate D6 (5/32 TASK) has higher power than the desired signal at the Rx antenna. For ACI −5 MHz away from the signal, a center frequency of an interferer is set to 75 MHz. Further, from a low value of an SIR (for example, −100 dB), the SIR is increased till a PER dips below 1%. Further, the PER should stay below 1% when the SIR is further increased. From FIG. 11, it is observed that, when ACI is at 75 MHz, the PER goes below 1% at the SIR as −28 dB. This means that a rejection ratio for the 75-MHz center frequency of the interferer is 28 dB. Similarly, the rejection ratio for an 85-MHz center frequency of the interferer is 57 dB. The ACI rejection ratio is considered to be a minimum of these values, for example, 28 dB. Based on similar arguments, the ALCI rejection ratio is given by minimum (76, 93), which is 76 dB.

The CBPF, the envelope detector, the ADC 102a, the direct current offset compensators 102b, the processor 104a, the energy detector 104b, the packet detector 104c, the direct current offset estimator 104d, the automatic gain controller 104e, the timing synchronizer, the frame synchronizer, the demodulator and the decoder in FIGS. 1-3B that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 6A-6D that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method to detect a packet, the method comprising:
receiving an input sequence comprising preambles;
detecting a transition from a noise period to a signal period in the input sequence;
dynamically adjusting a gain of the input sequence in response to the signal period being initiated; and
distinguishing an intended packet from other packets, among packets received in the preambles.

2. The method of claim 1, further comprising dynamically compensating for unknown offset voltage values of the input sequence in the signal period before the distinguishing of the intended packet from the other packets.

3. The method of claim 1, wherein the distinguishing of the intended packet from the other packets comprises:
computing a first peak autocorrelation value of an autocorrelation function in the noise period;
computing a second peak autocorrelation value of the autocorrelation function in the signal period;
determining whether a ratio of the second peak autocorrelation value to the first peak autocorrelation value exceeds a predetermined a ratio; and
obtaining peak times of the autocorrelation function in successive sub-intervals present in at least two consecutive preambles of the signal period.

4. The method of claim 3, wherein the distinguishing of the intended packet from the other packets further comprises:
determining whether at least one pair of the peak times is separated by a duration of a preamble having a jitter tolerance;
identifying outliers in the peak times; and
obtaining sanitized peak times by rejecting at most two of the outliers in the peak times.

5. The method of claim 3, wherein the distinguishing of the intended packet from the other packets further comprises:
determining whether each pair of successive sanitized peak times is separated by a predetermined fraction of a duration of a preamble having an error tolerance; and
distinguishing the intended packet from the other packets in response to determining that each pair of the successive sanitized peak times is separated by the predetermined fraction of the duration of the preamble having the error tolerance.

6. The method of claim 1, wherein the detecting of the transition from the noise period to the signal period comprises:
computing variances of the input sequence over time windows of an equal duration in the noise period and the signal period;
computing a relative variance value by computing a difference between each variance of each of the time windows and a reference value; and
determining whether the relative variance value exceeds a predetermined threshold for a predetermined number of consecutive time windows among the time windows.

7. The method of claim 1, wherein the detecting of the transition from the noise period to the signal period comprises:
dynamically compensating for unknown offset voltage values of the input sequence in the noise period; and
computing a first peak autocorrelation value of an autocorrelation function in the noise period.

8. The method of claim 1, wherein the intended packet is an IEEE 802.15.4q physical layer packet.

9. A non-transitory computer-readable storage medium storing instructions, that when executed by a processor, cause the processor to perform the method of claim 1.

10. The method of claim 1, wherein the distinguishing of the intended packet from the other packets comprises computing a first peak autocorrelation value of an autocorrelation function in the noise period.

11. The method of claim 10, wherein the distinguishing of the intended packet from the other packets further comprises computing a second peak autocorrelation value of the autocorrelation function in the signal period.

12. The method of claim 11, wherein the distinguishing of the intended packet from the other packets further comprises determining whether a ratio of the second peak autocorrelation value to the first peak autocorrelation value exceeds a predetermined a ratio.

13. The method of claim 1, wherein the distinguishing of the intended packet from the other packets comprises obtaining peak times of an autocorrelation function in successive sub-intervals present in at least two consecutive preambles of the signal period.

14. An ultra-low-power (ULP) wireless receiver, comprising:
a processor configured to receive an input sequence comprising preambles;
an energy detector configured to detect a transition from a noise period to a signal period in the input sequence;
an automatic gain controller configured to dynamically adjust a gain of the input sequence in response to the signal period being initiated; and
a packet detector configured to distinguish an intended packet from other packets, among packets received in the preambles.

15. The ULP wireless receiver of claim 14, further comprising:
a direct current offset compensator configured to dynamically compensate for unknown offset voltage values of the input sequence in the signal period before the intended packet is distinguished from the other packets.

16. The ULP wireless receiver of claim 14, wherein the packet detector is configured to distinguish the intended packet from the other packets by:
computing a first peak autocorrelation value of an autocorrelation function in the noise period;
computing a second peak autocorrelation value of the autocorrelation function in the signal period;
determining whether a ratio of the second peak autocorrelation value to the first peak autocorrelation value exceeds a predetermined a ratio; and
obtaining peak times of the autocorrelation function in successive sub-intervals present in at least two consecutive preambles of the signal period.

17. The ULP wireless receiver of claim 16, wherein the packet detector is further configured to distinguish the intended packet from the other packets by:
determining whether at least one pair of the peak times is separated by a duration of a preamble having a jitter tolerance;
identifying outliers in the peak times; and
obtaining sanitized peak times by rejecting at most two of the outliers in the peak times.

18. The ULP wireless receiver of claim 16, wherein the packet detector is further configured to distinguish the intended packet from the other packets by:
- determining whether each pair of successive sanitized peak times is separated by a predetermined fraction of a duration of a preamble having an error tolerance; and
- distinguishing the intended packet from the other packets in response to determining that each pair of the successive sanitized peak times is separated by the predetermined fraction of the duration of the preamble having the error tolerance.

19. The ULP wireless receiver of claim 14, wherein the energy detector is configured to detect the transition from the noise period to the signal period by:
- computing variances of the input sequence over time windows of an equal duration in the noise period and the signal period;
- computing a relative variance value by computing a difference between each variance of each of the time windows and a reference value; and
- determining whether the relative variance value exceeds a predetermined threshold for a predetermined number of consecutive time windows among the time windows.

20. The ULP wireless receiver of claim 14, wherein the energy detector is configured to detect the transition from the noise period to the signal period by:
- dynamically compensating for unknown offset voltage values of the input sequence in the noise period; and
- computing a first peak autocorrelation value of an autocorrelation function in the noise period.

21. The ULP wireless receiver of claim 14, wherein the intended packet is an IEEE 802.15.4q physical layer packet.

22. The ULP wireless receiver of claim 14, wherein the packet detector is configured to distinguish the intended packet from the other packets based on peak autocorrelation values of autocorrelation functions in the noise period and the signal period.

23. The ULP wireless receiver of claim 14, wherein the energy detector is further configured to detect the transition from the noise period to the signal period by computing variances of the input sequence over time windows of an equal duration in the noise period and the signal period.

24. The ULP wireless receiver of claim 23, wherein the energy detector is further configured to detect the transition from the noise period to the signal period by computing a relative variance value by computing a difference between each variance of each of the time windows and a reference value.

25. The ULP wireless receiver of claim 14, wherein the energy detector is further configured to detect the transition from the noise period to the signal period by determining whether a relative variance value exceeds a predetermined threshold for a predetermined number of consecutive time windows among time windows.

* * * * *